United States Patent
Ooba

(10) Patent No.: US 8,307,002 B2
(45) Date of Patent: Nov. 6, 2012

(54) IMAGE FORMING APPARATUS, DATA PROCESSING METHOD, COMPUTER-READABLE STORAGE MEDIUM ON WHICH A PROGRAM IS STORED, AND PROGRAM

(75) Inventor: Hideaki Ooba, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1480 days.

(21) Appl. No.: 11/113,655

(22) Filed: Apr. 25, 2005

(65) Prior Publication Data

US 2005/0257275 A1 Nov. 17, 2005

(30) Foreign Application Priority Data

Apr. 28, 2004 (JP) ................. 2004-132965

(51) Int. Cl.
*G06F 7/00* (2006.01)
(52) U.S. Cl. ...................................... 707/784
(58) Field of Classification Search .................. 707/781, 707/783, 784
See application file for complete search history.

(56) References Cited

U.S. PATENT DOCUMENTS

| | | | | |
|---|---|---|---|---|
| 4,858,116 A * | 8/1989 | Gillett et al. | .................. | 711/155 |
| 5,488,721 A * | 1/1996 | Rich et al. | ................. | 707/103 R |
| 5,493,105 A * | 2/1996 | Desai | ............................. | 235/375 |
| 5,710,900 A * | 1/1998 | Anand et al. | .................. | 715/764 |
| 6,016,502 A * | 1/2000 | Haneda et al. | ................ | 715/509 |
| 6,052,760 A * | 4/2000 | Bauman et al. | ................ | 711/119 |
| 6,345,288 B1 * | 2/2002 | Reed et al. | ..................... | 709/201 |
| 2002/0158970 A1 * | 10/2002 | Takeshi | ...................... | 348/211.3 |
| 2003/0076825 A1 * | 4/2003 | Guruprasad | .................. | 370/389 |
| 2004/0168058 A1 * | 8/2004 | Margolus | ..................... | 713/158 |
| 2004/0236718 A1 * | 11/2004 | Primm | .............................. | 707/1 |
| 2005/0132010 A1 * | 6/2005 | Muller | ........................ | 709/206 |

FOREIGN PATENT DOCUMENTS

| | | |
|---|---|---|
| JP | S64-078551 A | 3/1989 |
| JP | 11-119956 A | 4/1999 |
| JP | 2001-024971 A | 1/2001 |
| JP | 2002-259590 A | 9/2002 |
| JP | 2002-366794 A | 12/2002 |
| JP | 2002-369119 A | 12/2002 |
| JP | 2004-128548 A | 4/2004 |
| WO | 03-083678 A1 | 10/2003 |

* cited by examiner

*Primary Examiner* — Robert Beausoliel, Jr.
*Assistant Examiner* — Nirav K Khakhar
(74) *Attorney, Agent, or Firm* — Canon USA, Inc., IP Divison

(57) ABSTRACT

In an image forming apparatus, a user of the image forming apparatus is authenticated, and a search is performed for user information stored in the storage unit by the authenticated user. Of all user information detected in the searching, deletable user information is displayed on a category-by-category basis on a display unit. In a mode selected from a plurality of modes, user information displayed on a category-by-category basis on the display unit is deleted from the storage unit.

11 Claims, 24 Drawing Sheets

FIG. 21

| 2300 | 2301 | 2302 | 2303 | 2304 | 2305 | 2306 | 2307 |
|---|---|---|---|---|---|---|---|
| SERIAL NUMBER | DATE/ TIME | SECTION ID | DESTINATION | ADDRESS ATTRIBUTE | FILE NAME | USER NAME | RESULT |
| 11 | 09/04 13:20 | ------ | ooba@com | A | ·test.pdf | A | OK |
| 12 | 09/12 19:05 | ------ | aaaa@bbbb.co.jp | A | ·bag.tif | A | NG |
| 13 | 09/15 09:43 | ------ | abc@abcde.co.jp | C | ·function_specifica- tions.doc | C | OK |
| ⑭ | 09/23 12:10 | ------ | ftp://111.111.0.1 | A | ·aaa.tif | B | OK |
| ------ | ------ | ------ | ------ | ------ | ------ | ------ | ------ |

ALL DATA DELETION MENU

ADDRESS TABLE OF USER A

| CLASS | NAME | ADDRESS | NOTE | DELETE |
|---|---|---|---|---|
| 2200 | 2201 | 2202 | 2203 | 2204 |
| ≡ | ooba | ooba@cxxx.co.jp | USER | ☑ 2205 |
| 📁 | e-sato | ftp://111.111.0.1 | PRESENTATION | ☐ 2206 |
| ≡ | PURCHASE | abc@abcde.co.jp | TRANSACTION | ☑ 2207 |

2211

2208

CLOSE — 2209

CANCEL — 2210

FIG. 23

ALL DATA DELETION MENU

RESULT OF ALL DATA DELETION FOR USER A

| | | |
|---|---|---|
| ADDRESS TABLE | 97 DELETED | 3 UNDELETED |
| BOXES | 145 DELETED | 5 UNDELETED |
| OPERATION HISTORY | 600 DELETED | 0 UNDELETED |
| MACROS | 1 DELETED | 11 UNDELETED |
| FAVORITE KEYS | 3 DELETED | 0 UNDELETED |
| JOB HISTORY | 0 DELETED | 10 UNDELETED |

DELETE USER — 1903     1901     CLOSE — 1900     1902

FIG. 34

STORAGE MEDIUM SUCH AS FD OR CD-ROM

| DIRECTORY INFORMATION |
|---|
| FIRST DATA PROCESSING PROGRAM<br>PROGRAM CODE CORRESPONDING<br>TO STEPS IN FLOW CHART SHOWN IN FIG. 9 |
| SECOND DATA PROCESSING PROGRAM<br>PROGRAM CODE CORRESPONDING<br>TO STEPS IN FLOW CHART SHOWN IN FIG. 14 |
| THIRD DATA PROCESSING PROGRAM<br>PROGRAM CODE CORRESPONDING<br>TO STEPS IN FLOW CHART SHOWN IN FIG. 18 |
| FOURTH DATA PROCESSING PROGRAM<br>PROGRAM CODE CORRESPONDING<br>TO STEPS IN FLOW CHART SHOWN IN FIG. 26 |
|  |

IMAGE FORMING APPARATUS, DATA PROCESSING METHOD, COMPUTER-READABLE STORAGE MEDIUM ON WHICH A PROGRAM IS STORED, AND PROGRAM

BACKGROUND OF THE INVENTION

1. Field of the Invention

The present invention relates to an image forming apparatus including storage means for storing user information, a data processing method, a computer-readable storage medium on which a program is stored, and a program.

2. Description of the Related Art

An image forming apparatus is known which includes a printer for printing in accordance with image data input from a scanner and which also includes a communication interface that allows it to receive a print job from an external apparatus such as a host computer by communicating with the external apparatus. Such an image forming apparatus is usually called a multifunction apparatus.

Some image forming apparatuses include data storage means such as a hard disk serving as an external storage device, and a print job received from a host computer is stored in the data storage means. After authentication based on ID information or the like is performed, if a print command is issued via an operation unit, printing of the print job stored in the data storage means is performed in a secure manner.

Personal information is also stored in storage areas (called box areas) assigned for use by respective users and used in various kinds of image processing (including facsimile communication, e-mail transmission, etc.) An example of such a technique may be found, for example, in Japanese Patent Laid-Open No. 11-119956.

In the image forming apparatus described above, when a user moves to another section of the same or different office because of a personnel change or the like, it is necessary to delete personal information stored in a box area assigned to the user and store it in another image forming apparatus located in the new section.

To delete user's personal information including information inaccessible by other users from the box area assigned to the user, the user has to retrieve information and delete it record by record by performing an operation on the operation unit until all user information is deleted.

Because retrieval and deletion of data are performed manually, deletion is very inefficient. Furthermore, in manual retrieval of data, it is difficult to find all data, and there is a possibility that some data remains without being deleted. This causes confidential information or personal information of the user to be exposed to third persons. This is a serious problem from the point of view of security.

If some data remains in a box area without being deleted, the storage resource of the external storage device is needlessly occupied by the remaining data without being released.

SUMMARY OF THE INVENTION

The present invention provides an image forming apparatus, a data processing method, a program, and a computer-readable storage medium on which a program is stored, that allow it to select particular data from all user data stored in the image forming apparatus and delete the selected user data by performing a simple operation in a mode selected from a plurality of data deletion modes.

The present invention also provides an image forming apparatus, a data processing method, a program, and a computer-readable storage medium on which a program is stored, that allow it to, when a command to delete all user information is issued by a user, delete all user information except for user information set by a particular user to be undeletable thus preventing useful user information from being deleted in the deletion process performed in response to a command issued by the user to delete all data.

The present invention also provides an image forming apparatus, a data processing method, a program, and a computer-readable storage medium on which a program is stored, that allow it to, in accordance with a data movement command issued before a data delete command, store user information in a storage unit as user information of one or more other users such that the user information can be used as user information of the one or more other users.

The present invention also provides an image forming apparatus, a data processing method, a program, and a computer-readable storage medium on which a program is stored, that allow it to, in accordance with a data save command issued before a data delete command, transfer user information to an external apparatus to store it therein such that user information specified by a user can be used on the external apparatus.

More specifically, the present invention provides an image forming apparatus for performing image processing in accordance with user information, the image forming apparatus including: a storage unit for storing the user information on a category-by-category basis, an authentication unit for authenticating a user of the image forming apparatus, a search unit for searching for user information stored in the storage unit by a user authenticated by the authentication unit, detecting deletable user information of all user information detected in searching, and displaying the detected deletable user information on a category-by-category basis on a display unit, a designation unit for selectively designating one of a plurality of deletion process modes in which to delete user information displayed by the search unit on a category-by-category basis on the display unit, and a deletion unit for deleting the user information from the storage unit in the deletion process mode designated by the designation unit.

In the image forming apparatus, the deletion process modes selectively designated by the designation unit may include a mode in which all data is deleted at a time, a mode in which data of a selected category is deleted, and a mode in which data is deleted category by category in accordance with a wizard.

The image forming apparatus may further include a setting unit for setting user information such that, of all user information stored in the storage unit, particular user information is set to be undeletable on a category-by-category basis in accordance with a designation given by a particular user; and the deletion unit may delete all user information from the storage unit except for user information set by the setting unit to be undeletable.

In the image forming apparatus, the user information stored in the storage unit may be accessible by one or more other users. The image forming apparatus may further include an access history storage unit for storing an access history in terms of accessing the user information by one or more other users, and the deletion unit may delete all user information from the storage unit except for user information that has been accessed by one or more other users in accordance with the access history stored in the access history storage unit.

The image forming apparatus may further include a movement control unit for issuing a move command to move user information selected from the user information displayed by the search unit on a category-by-category basis on the display unit into a storage area of the storage unit in which user information of another user is stored, before the deletion unit deletes the user information, and a movement unit for storing the user information in the storage unit as user information of another user, in accordance with the move command issued by the movement control unit.

The image forming apparatus may further include an external saving control unit for issuing a save-externally command to save user information selected from the user information displayed by the search unit on a category-by-category basis on the display unit into an external apparatus, before the deletion unit deletes the user information, and an external saving unit for transferring the user information to the external apparatus and storing the user information therein in accordance with the save-externally command issued by the external saving control unit.

The present invention also provides a data processing method of performing data processing in an image forming apparatus including a storage unit for storing user information on a category-by category basis, for performing image processing in accordance with user information stored in the storage unit. The method includes steps of: authenticating a user of the image forming apparatus, searching for user information stored in the storage unit by the authenticated user, detecting deletable user information of the user information detected in searching, displaying the detected deletable user information on a category-by-category basis on a display unit, selectively designating one of a plurality of deletion process modes in which to delete the user information displayed on a category-by-category basis on the display unit, and deleting the user information from the storage unit in the designated deletion process mode.

The present invention also provides a computer program for implementing a data processing method of performing data processing in an image forming apparatus as described above.

The present invention also provides a computer-readable storage medium including a computer program stored thereon for implementing a data processing method as described above.

The present invention also provides a data processing apparatus capable of performing processing based on a plurality of types of registered information associated with each of a plurality of users, the registered information being stored in a storage unit, the apparatus including an input unit adapted to input data identifying at least one of the plurality of users, and a controller adapted to delete the plurality of types of registered information associated with the at least one of the plurality of users identified by the input data.

The present invention also provides a method of processing data in an apparatus capable of performing processing based on a plurality of types of registered information associated with each of a plurality of users, the registered information being stored in a storage unit, the method including steps of inputting data identifying at least one of the plurality of users, and deleting the plurality of types of registered information associated with the at least one of the plurality of users identified by the input data.

Further features and advantages of the present invention will become apparent from the following description of exemplary embodiments with reference to the attached drawings.

BRIEF DESCRIPTION OF THE DRAWINGS

FIG. 21 is a diagram showing an example of a job history table stored in a battery-backed RAM shown in FIG. 1.

FIG. 22 is a diagram showing an example of a confirmation screen displayed on the LCD shown in FIG. 3.

FIG. 23 is a diagram showing an example of an all data deletion menu screen displayed on the LCD shown in FIG. 3.

FIG. 34 is a diagram showing a memory map of a storage medium in which various data processing programs, which are read and executed by an image forming apparatus according to an embodiment of the present invention, are stored.

DESCRIPTION OF THE EMBODIMENTS

With reference to the accompanying drawings, embodiments of the present invention are described below.

Figure 1:
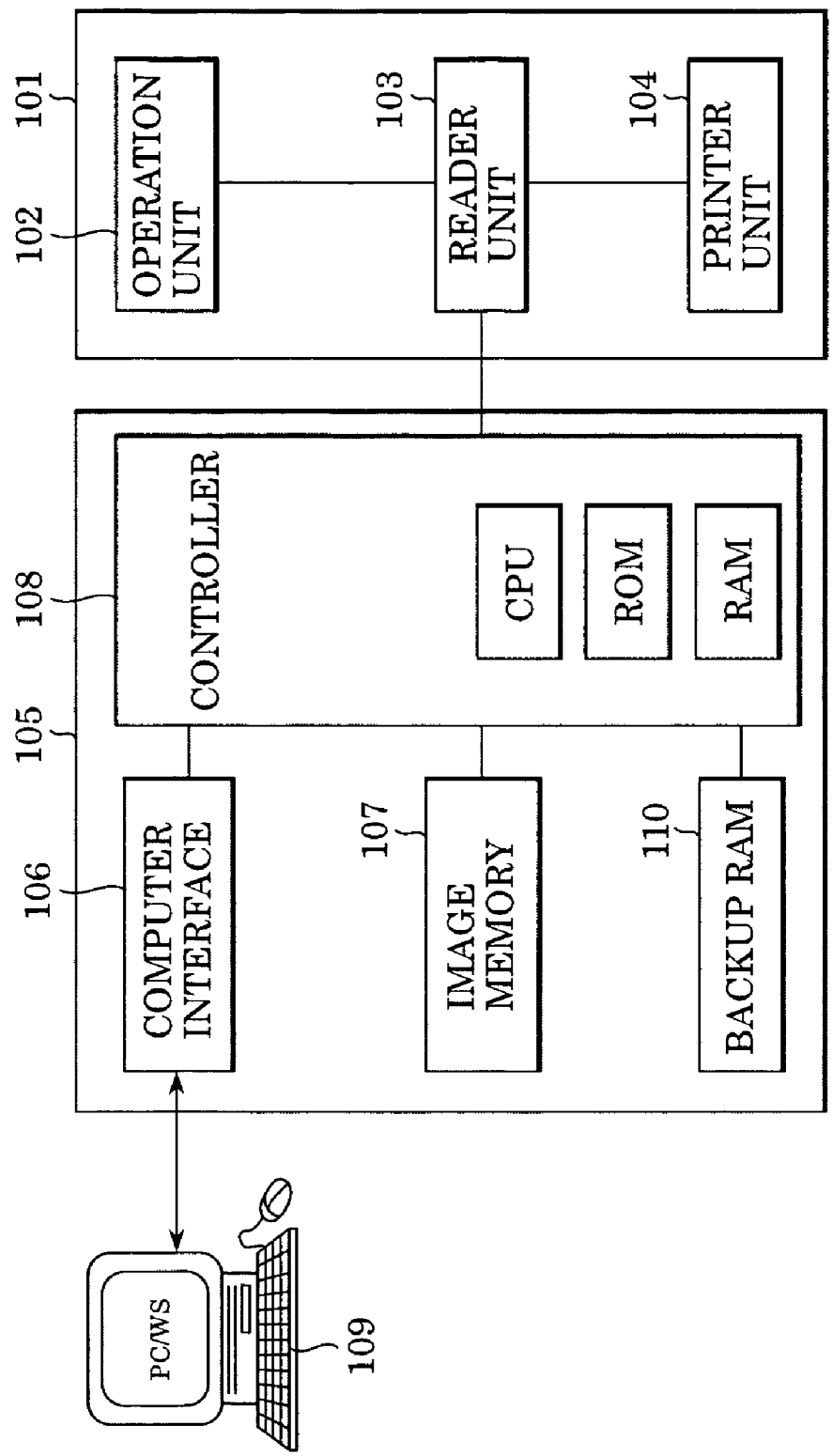
FIG. 1 is a block diagram showing the structure of a digital copier, which is an example of an image processing apparatus according to an embodiment of the present invention.

FIG. 1 is a block diagram showing the structure of a digital copier, which is an example of an image processing apparatus according to an embodiment of the present invention.

As shown in FIG. 1, the digital copier of the present embodiment includes a main unit 101 of the digital copier and an image input/output controller 105.

The main unit 101 of the digital copier includes an operation unit 102, a reader unit 103, and a printer unit 104. The operation unit 102 is used to control the operation of the main unit 101 of the digital copier and the image input/output controller 105. The reader unit 103 reads an image of an original document and outputs image data representing the image of the original document to the printer unit 104 and the image input/output controller 105. The printer unit 104 forms an image on paper in accordance with the image data received from the reader unit 103 via the image input/output controller 105.

The image input/output controller 105 includes a computer interface unit 106, an image memory 107, a controller 108, and a battery-backed random access memory (RAM) 110 and is connected to the reader unit 103.

In a free space of the image memory 107 or the battery-backed RAM 110, an area is allocated for use by each user (identified by an authenticated ID). Each user is allowed to store data including up to a predetermined number of records of each category (such as an address table, an operation history, macros, short-cut keys, job history, etc.) in an area allocated for use by the user.

As described later, the image memory 107 has box areas assignable to respective users. Alternatively, personal information may be stored in storage areas of an external storage device.

Note that in the present embodiment, data associated with respective users are generically referred to as personal data. Personal data can be deleted under the control of the controller 108 in a mode selected from a plurality of deletion modes (a mode in which all data is deleted at a time, a mode in which data of a selected category is deleted, and a mode in which all data is deleted in accordance with a wizard).

The computer interface unit 106 is an interface between the controller 108 and a personal computer (PC) or a workstation (WS) serving as a printer server (PC/WS) 109. The computer interface unit 106 converts code data (PDL data) representing an image received from the PC/WS 109 to image data printable by the printer unit 104, and transfers the resultant image data to the controller 108. The computer interface unit 106 and PC/WS 109 may be connected to each other via a network such as the Ethernet.

The controller 108 includes a central processing unit (CPU), a read-only memory (ROM), and a RAM. The CPU controls data flow among the reader unit 103, the computer interface 106, and the image memory 107, by executing a program stored in the ROM or another storage medium.

The battery-backed RAM 110 is a memory that retains data even after power is turned off, and is used to store data that needs to be retained in the main unit 101 or the image input/output controller 105 of the digital copier.

The PC/WS 109 has a CPU, a ROM, a RAM, etc. (not shown). The CPU performs various processes by executing a program stored in the ROM or another storage medium.

Figure 2:
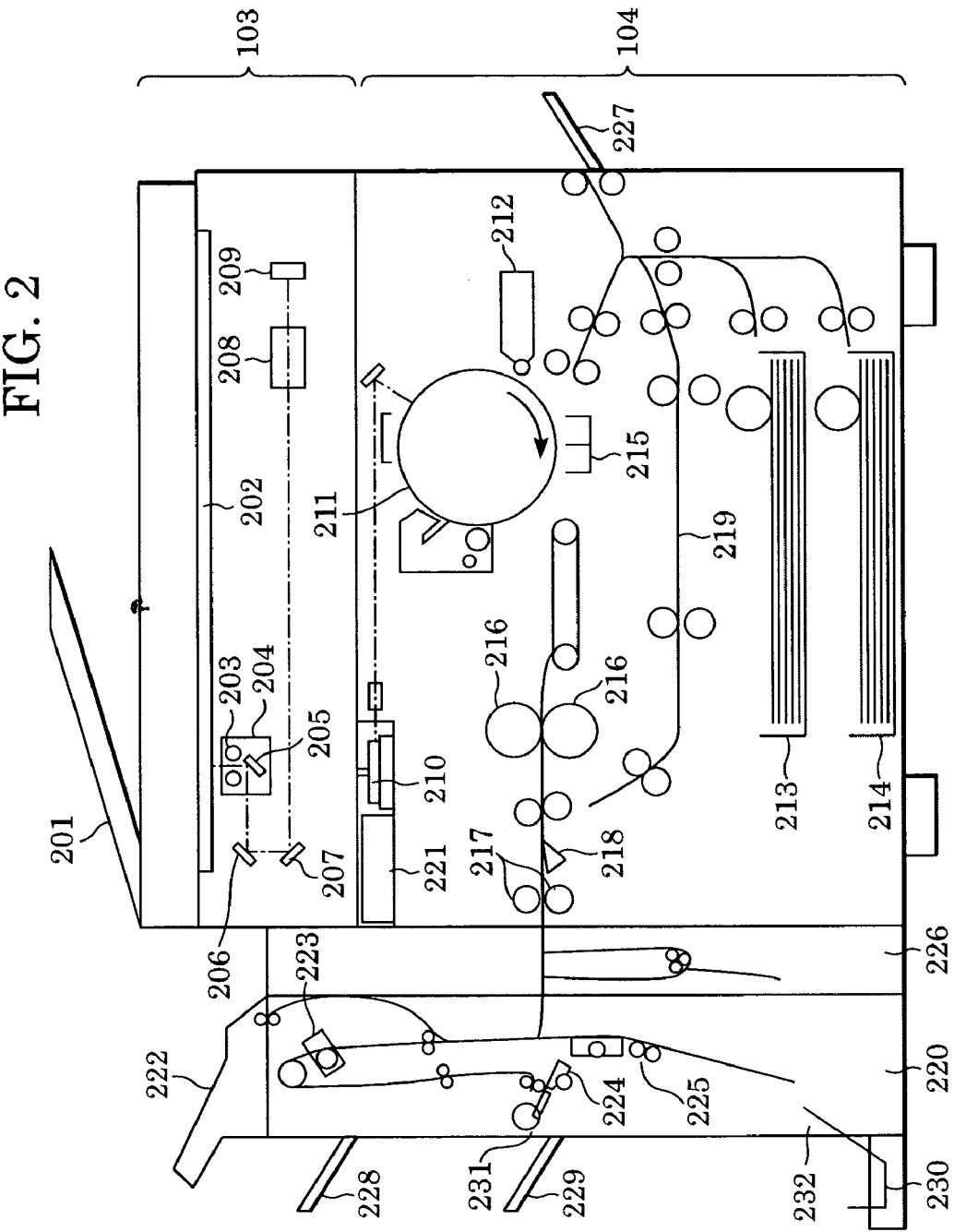
FIG. 2 is a sectional view showing the structure of a reader unit and a printer unit shown in FIG. 1.

FIG. 2 is a sectional view showing the structure of the reader unit 103 and the printer unit 104 shown in FIG. 1. In the example shown in FIG. 1, the printer unit 104 has a finisher.

In FIG. 2, a document feeder 201 is used for feeding original documents one by one onto platen glass 202 and for removing a document from the platen glass 202 after reading of the document is completed. When a document is placed on the platen glass 202, a lamp 203 is lit, and moving of a scanner unit 204 is started to scan the document while exposing the document to light. Light reflected from the document is directed to a CCD (charge-coupled device) image sensor 209 (hereinafter, referred to simply as a CCD) through mirrors 205, 206, and 207 and a lens 208. The CCD 209 reads a scanned document image.

A laser driver 221 drives a laser light emitting unit 210 such that laser light corresponding to output image data is emitted from the laser light emitting unit 210. The laser light strikes the surface of a photosensitive drum 211. As a result, a latent image corresponding to the laser light is formed on the photosensitive drum 211.

A developer is applied by a developing unit 212 to the latent image on the photosensitive drum 211. In a case of a color image forming apparatus, four developing units for yellow (Y), magenta (M), cyan (C), and black (K) are used. In synchronization with starting of exposure of the photosensitive drum 211 to the laser light, paper is fed to a transfer unit 215 from a cassette 213, a cassette 214, or a manual paper feeder 227. The transfer unit 215 transfers the developer applied to the photosensitive drum 211 to the paper. After the developer is transferred to the paper, the paper is transported to a fuser unit 216. The fuser unit 216 fuses the developer on the paper by applying heat and pressure thereto.

After the paper is fused by the fuser unit 216, the paper is transported to the outside via feed-out rollers 217. In a two-sided copying mode, after the paper is transported to the feed-output rollers 217, the feed-out rollers 217 are rotated in a reverse direction such that the paper is transported to a re-feeding path 219 via a flapper 218. The paper is then transported to the transfer unit 215 via the re-feeding path 219 in synchronization with starting of exposure of the photosensitive drum 211 to the laser light.

In a case in which paper is Z-folded using a Z-folder 226 equipped with the main unit of the digital copier, the paper is transported to the Z-folder 226 and Z-folded in accordance with a command issued via the operation unit 102.

In a case in which the digital copier has a finisher 220, sheets of paper output from the main unit of the digital copier are sorted, punched by a puncher 223, and stapled by a stapler 224 as specified by a user.

If needed, binding is performed such that a bundle of paper is stitched at the center of paper by a saddle stitches 225 and folded at the center. An inserter 222 supplies preprinted paper as cover paper or inserting paper. Because the paper from the inserter 222 is supplied directly without being passed through the paper transportation path of the printer unit, the paper is not damaged. A job, which does not need the saddle stitches 225, is transported onto a movable tray 228 or 229 via a paper output slit 231. The trays 228 and 229 are movable up and down. When a movable tray 228 is used, the movable tray 228 is moved to a position corresponding to the paper output slit 231. A job which uses the saddle stitches 225 is transported to a binding tray 230 via a paper output slit 232.

Figure 3:
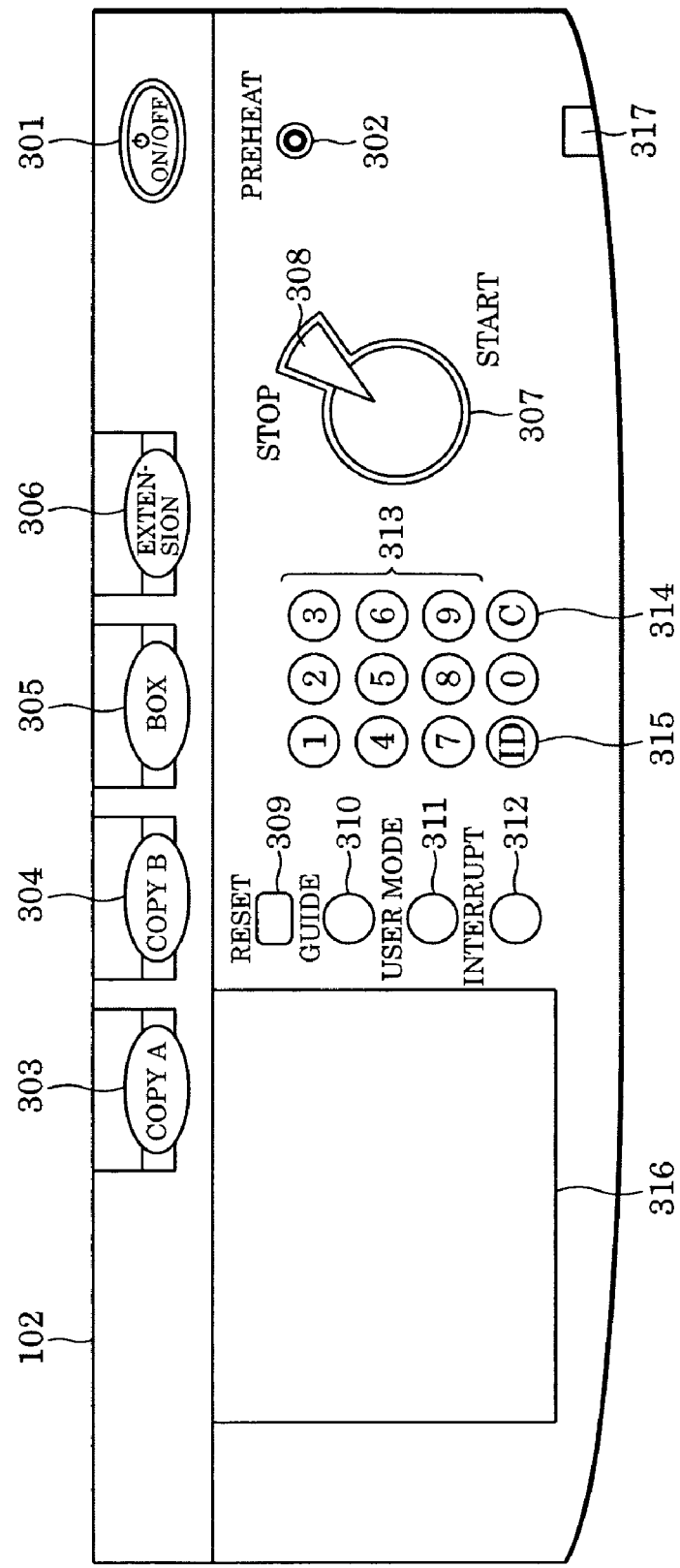
FIG. 3 is a plan view showing a key arrangement of an operation unit shown in FIG. 1.

FIG. 3 is a plan view showing a key arrangement of the operation unit 102 shown in FIG. 1.

In FIG. 3, power switch 301 is used for controlling power supply to the main unit 101 and the image input/output controller 105 of the digital copier. Each time a preheat key 302 is pressed, the preheating mode is toggled on/off. A copy-A mode key 303 is used to select a copy-A mode from a plurality of functions. A copy-B mode key 304 is used to select a copy-B mode. The copy-A mode and the copy-B mode provide the same function. Two copy modes are provided to provide an easier understanding that when scanning is completed in one of modes, scanning of a next copying operation can be started using that mode.

A mailbox key 305 is used to select a mailbox mode from the plurality of functions. The mailbox refers to a memory area allocated in a memory of the copier for use by a user or a section of a company. PDL data or scanned image data can be stored in the mailbox and can be output therefrom when it is necessary.

An extension key 306 is used for operation on PDL data. Keys 303 to 306 are also used to display a function screen on the LCD 316 as will be described in detail later.

A copy start key 307 is used to start a copying operation. A stop key 308 is used to stop a copying operation. A reset key 309 is used to reset a standby mode into a normal mode. A guide key 310 is used to display guide (help) information of functions.

A user mode key 311 is used by a user to change the basic setting of the system. An interrupt key 312 is used to perform another copying job by interrupting a current copying job. Numeric keys 313 are used to input a numeric value. A clear key 314 is used to clear a numeric value. If an ID key 315 is pressed, the operation mode is switched into a mode for inputting ID.

An LCD touch panel (LCD) 316 is composed of a liquid crystal display screen and a touch sensor. A setting screen specific to each mode is displayed on the LCD touch panel. A user can set details of operation conditions by touching a key displayed on the LCD touch panel. A status of operation of a job is also displayed on the LCD touch panel. A tarry lamp 317 is used to indicate the status of communication via the network. In a normal state, the tarry lamp 317 is lit in green and blinks, but it is lit in red when an error occurs in the network.

Figure 4:
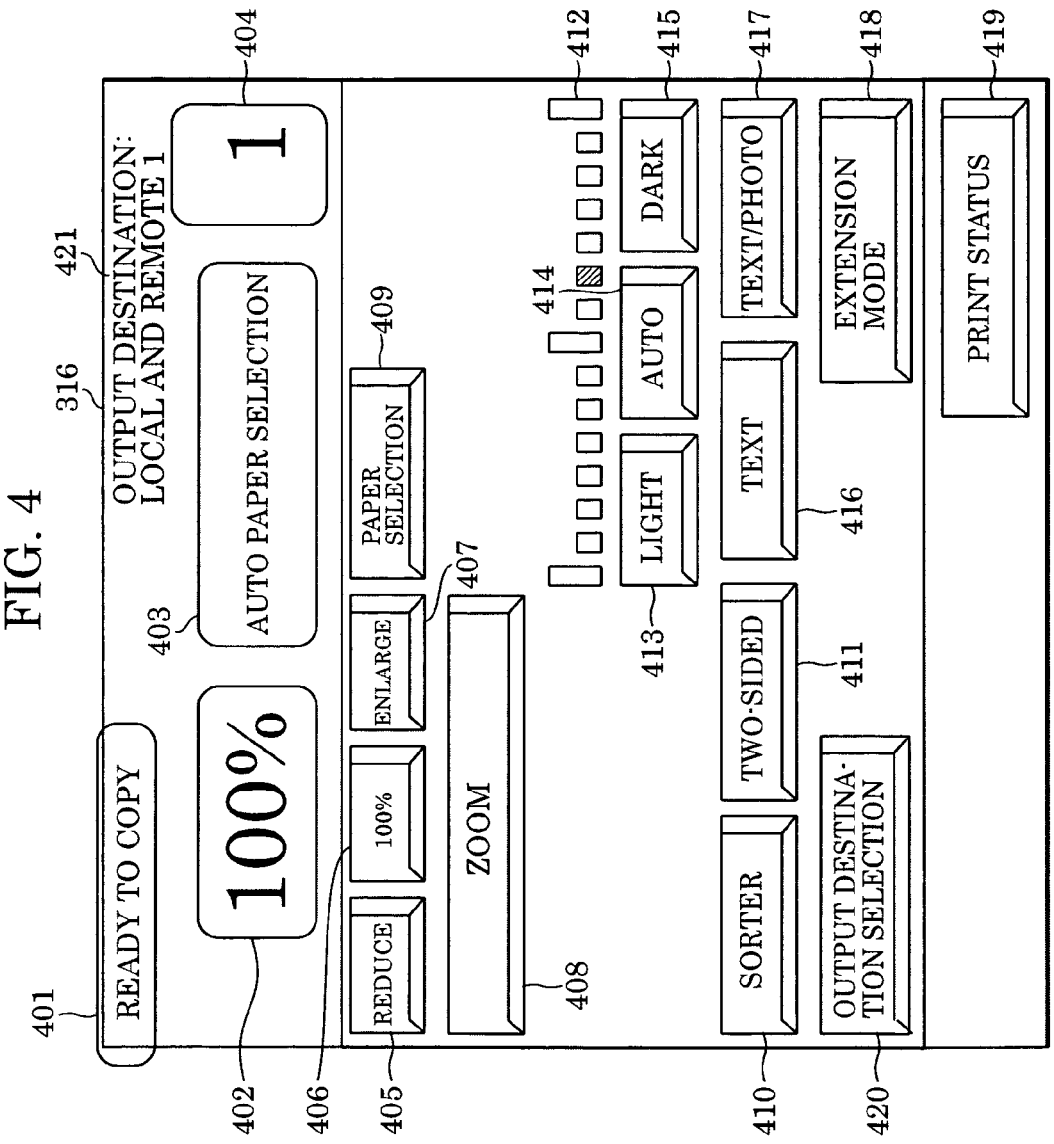
FIG. 4 is a diagram showing a standard copy screen displayed on an operation control panel shown in FIG. 3.

FIG. 4 is a diagram showing a standard copy screen displayed on the control panel 316 shown in FIG. 3. In the image processing apparatus of the present embodiment, this copy screen appears as a default when power is turned on.

In FIG. 4, a message line 401 is used to display a message to indicate the status of a copy job. A magnification factor indicator 402 indicates a magnification factor as a percentage. The magnification factor is automatically or manually set by a user in the copy mode. A paper size indicator 403 indicates a selected paper size. In an automatic paper selection mode, a message "Auto Paper Selection" is displayed.

A number of copies indicator 404 indicates the number of copies to be made. A reduction key 405 is used to specify a reduction copy mode. A 100% key 406 is used to set the magnification factor to 100%. If this key is pressed, the current magnification/reduction factor is reset to 100%. An enlargement key 407 is used to specify an enlargement copy mode. A zoom key 408 is used to specify a magnification factor in the reduction/enlargement copy mode.

A paper selection key 409 is used to specify paper. A sorter key 410 is used to specify a sort/staple mode. A two-sided key 411 is used to specify a two-sided mode.

A density indicator bar 412 indicates the current density level. The density level indicated by the indicator bar 412 increases from left to right. The indication of the density on the indicator bar 412 varies in synchronization with pressing of a light key 413 or a dark key 415. If the light key 413 is pressed, the density level is reduced. On the other hand, if the dark key 415 is pressed, the density level is increased. If an auto key 414 is pressed, an automatic density adjustment mode is activated.

A text key 416 is used to specify a mode in which the density is automatically adjusted to a level suitable for copying a text document. A text/photo key 417 is used to specify a mode in which the density is automatically adjusted to a level suitable for copying a document including both text and photograph. An extension mode key 418 is used to specify an extension mode for setting various conditions that cannot be set on the standard copy screen.

A print status key 419 is used to view the current print job status of the digital copier 101 or the job history. The print status key 419 is displayed not only in the standard copy screen but also in other screens at the same position such that a user can view the print status by pressing the print status key 419 in any screen.

An output destination selection key 420 is used to select a destination to which to output a scanned image. The selected output destination is displayed in a destination display area 421. Possible output destinations include a printer engine (the printer unit 104 shown in FIG. 1) of the present digital copier, boxes (described later) of the present digital copier, a printer engine of another digital copier located on the same network, and boxes of another digital copier. A printer engine and a box are allowed to be specified as destination at the same time. In the example shown in FIG. 4, a local printer (the printer engine of the present digital copier) and a remote printer 1 (a box of another digital copier) are specified as destinations.

Figure 5:
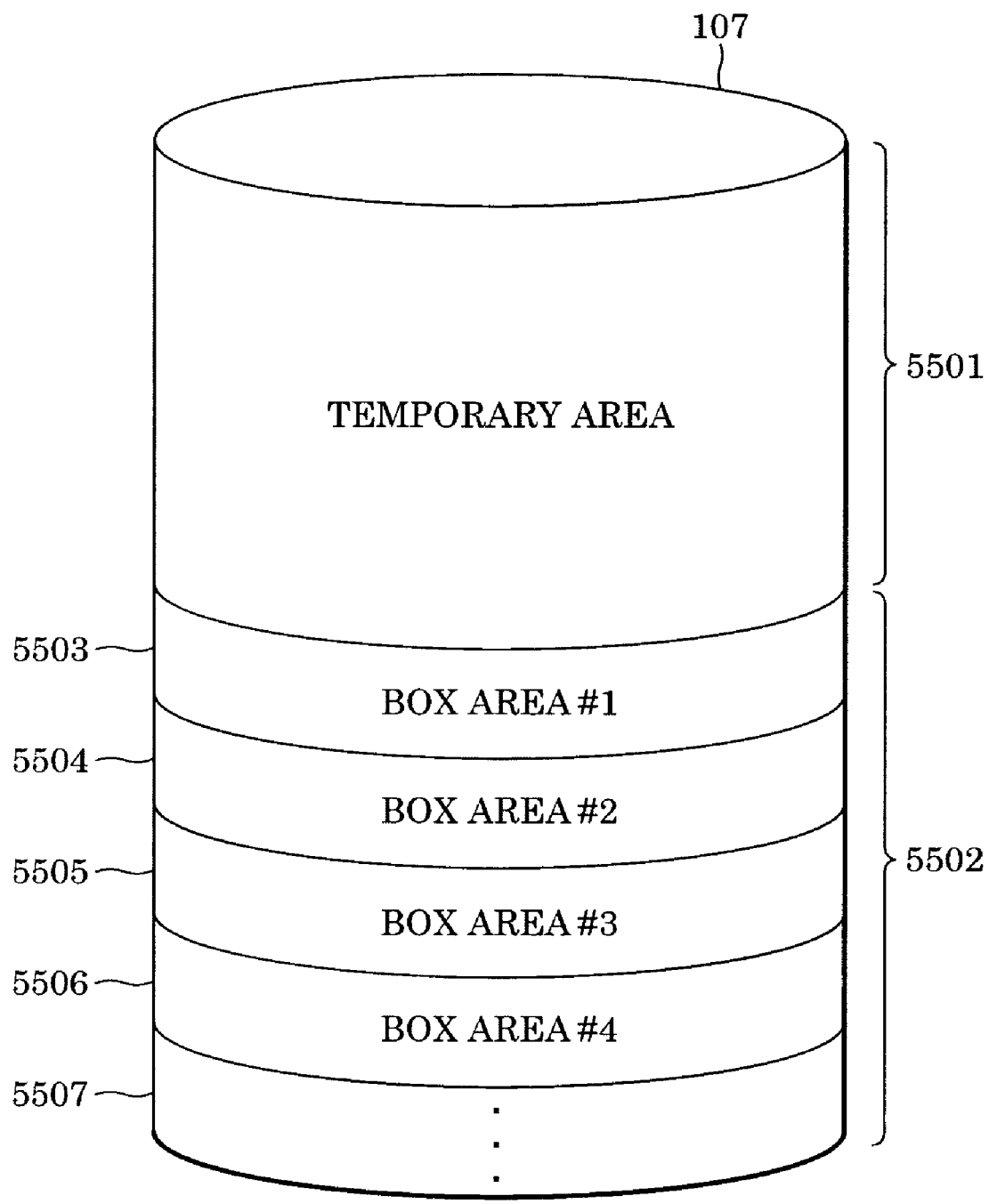
FIG. 5 is a diagram showing a manner in which an image memory shown in FIG. 1 is divided into logical memory areas.

FIG. 5 is a diagram showing a manner in which the image memory 107 shown in FIG. 1 is divided into logical memory areas.

In the present embodiment, as shown in FIG. 5, the memory area of the image memory 107 (such as a hard disk) is divided into a temporary area 5501 and box areas 5502.

The temporary area 5501 is used to temporarily store image data received from a scanner or image data in a PDL form. This makes it possible, for example, to output image data in an order different from an order in which image data is input. It also becomes possible to output the same image data many times without having to perform scanning many times. The box area 5502 is a memory area used to realize box functions. The box area 5502 is divided into sub-areas 5503 to 5507 (box areas 1 to n). The box areas (hereinafter referred to simply as boxes) 5503 to 5507 are assigned to respective users or sections/departments of a company. A box name and password may be assigned to each box. Each user is allowed to store a PDL job or a scan job in a specified box. A user has to input a password to access a box to view the content of the box, output data from the box, or change the setting.

In the present embodiment, there are two types of users of the image forming apparatus. One type of users are those who are authorized as administrators. The other type of users are ordinary users who are allowed to use box functions. Operations allowed for users to perform in setting of the box environment and deleting of information are different depending on whether users are authorized as an administrator or an ordinary user, as described in detail below.

Setting of Deletion Environment by an Administrator

Figure 6:
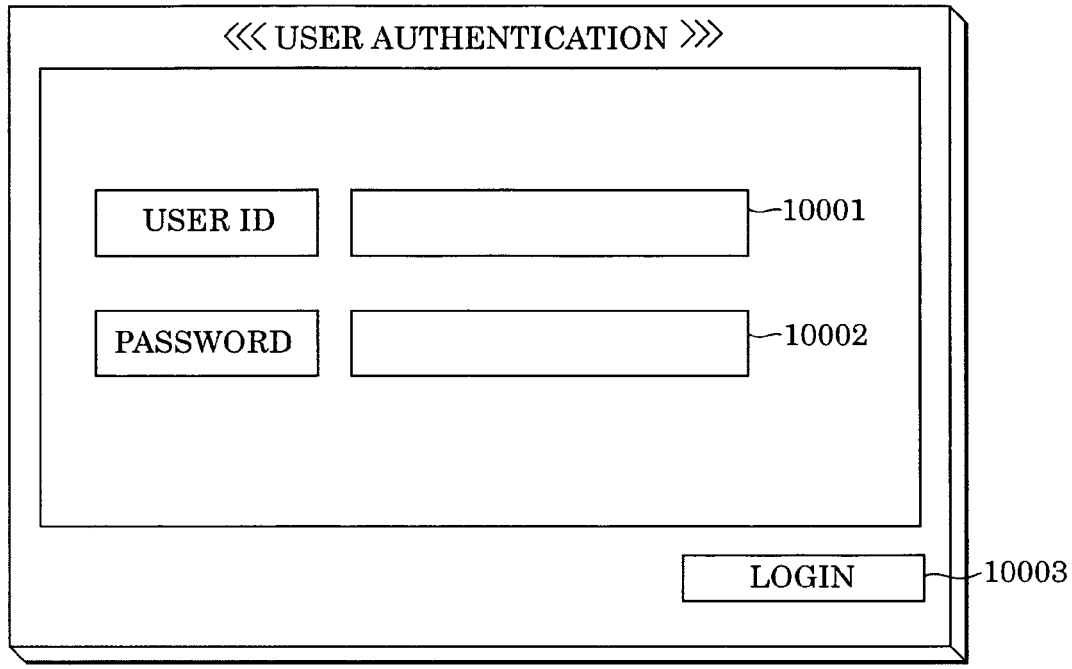
FIG. 6 is a diagram showing an example of a personal authentication screen displayed on an LCD shown in FIG. 3.

FIG. 6 is a diagram showing an example of a personal authentication screen displayed on the LCD 316 shown in FIG. 3. The personal authentication screen appears on the LCD 316 when the user mode button 311 (FIG. 3) is pressed. Information displayed on the operation unit 102 is controlled by the controller 108 in accordance with a procedure described later. Information required in the authentication process may be stored in a management area of the image memory 107 or in a nonvolatile memory (not shown) in a predetermined table form. There are no particular restrictions on the memory area and the form in which the information required in the authentication process is stored, as long as the CPU of the controller 108 can access the memory to read the information.

When the screen shown in FIG. 6 is displayed on the operation unit 102 of the image forming apparatus, if a user inputs an administrator ID in a personal ID input field 10001 and a password in a password input field 10002 and if the user then presses a login button 10003, the controller 108 compares the input administrator ID with a registered administrator ID for authentication. If the user is registered as an authorized administrator, the user is allowed to log in as an administrator to the image forming apparatus.

Figure 7:
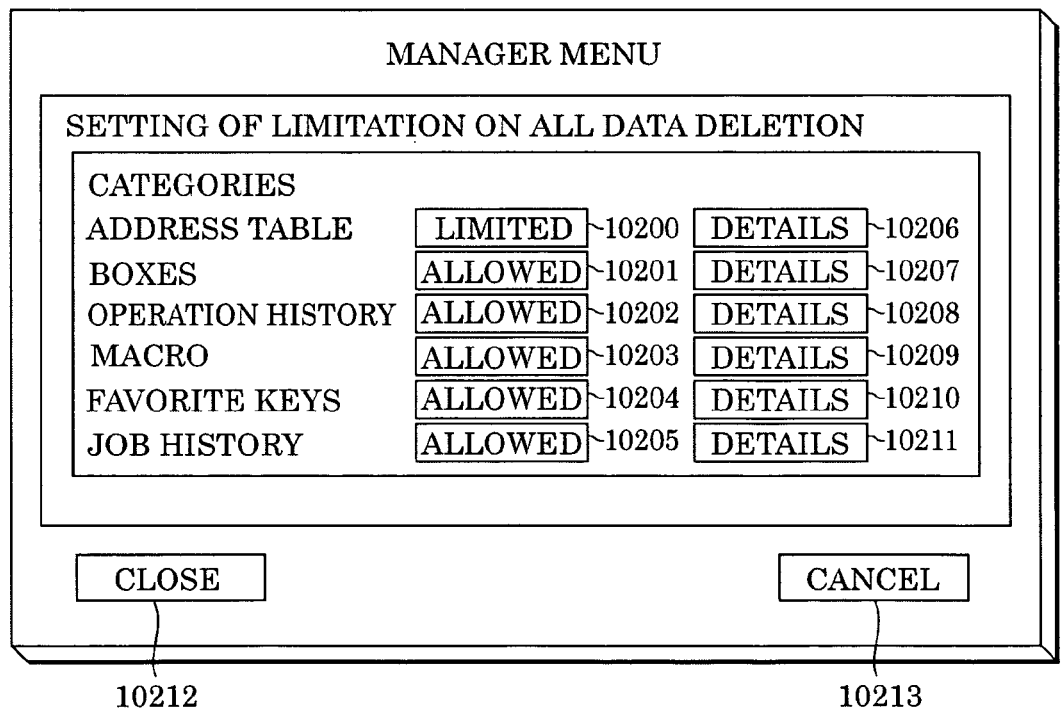
FIG. 7 is a diagram showing an example of an administration menu screen displayed on an image forming apparatus according to an embodiment of the present invention.
Figure 8:
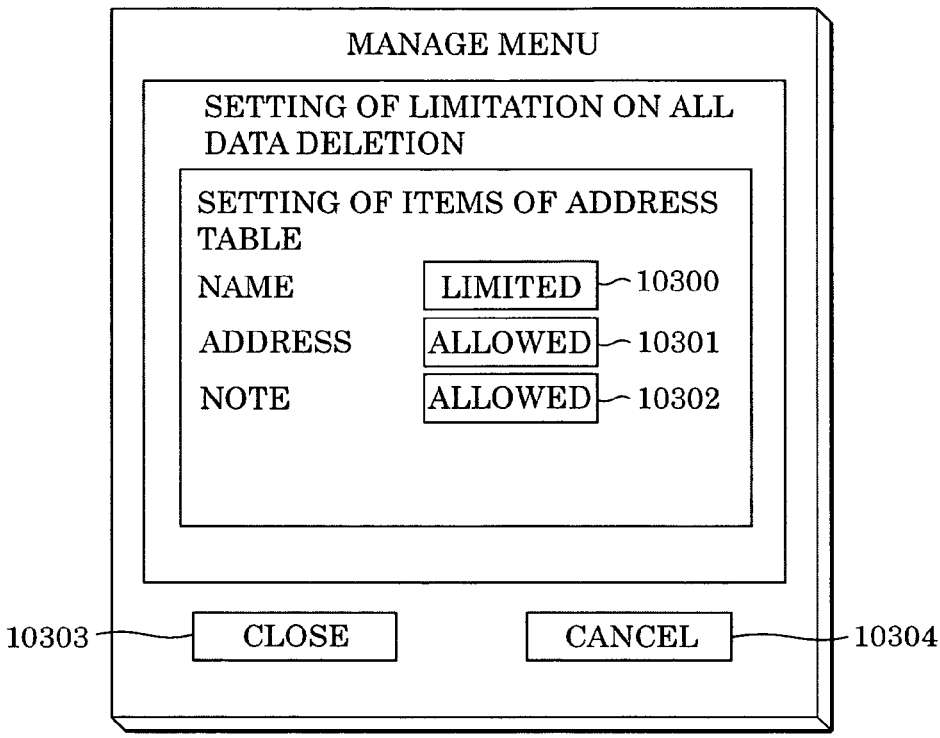
FIG. 8 is a diagram showing an example of an administration menu screen displayed on an image forming apparatus according to an embodiment of the present invention.

FIGS. 7 and 8 show examples of administration menu screens displayed on the LCD 316 shown in FIG. 3 of the image forming apparatus.

In FIG. 7, 10200 to 10205 denote category setting buttons (hereinafter referred to simply as buttons). The button 10200 is used to set the restriction attribute of an address table in terms of deleting of data of the address table. Each time the button 10200 is pressed, the attribute is toggled, under the control of the controller 108, between a state in which deleting is restricted and a state in which deleting is allowed. If a close button 10212 is pressed, the attribute specified by the button 10200 is stored in an all-deletion restriction attribute table in the image memory 107 or another nonvolatile memory (not shown).

Similarly, the button 10201 is used to set the all-deletion restriction attribute of boxes, and the button 10202 is used to set the all-deletion restriction attribute of the operation history. The button 10203 is used to set the all-deletion restriction attribute of macros, and the button 10204 is used to set the all-deletion restriction attribute of short-cut keys. The button 10205 is used to set the all-deletion restriction attribute of job history. The short-cut key refers to a soft key displayed on the standard screen such that an image forming mode which is frequently used by a user can be selected by pressing the short-cut key. If a cancel button 10213 is pressed, the current screen returns, under the control of the controller 108, to the standard screen shown in FIG. 4.

The buttons 10200 to 10205 may be in the form of check boxes or lists. The administration menu further includes buttons 10206 to 10211 used to determine the details of the restriction on respective categories. For example, after the button 10200 is pressed to set the all-deletion restriction attribute to the limited state, if the button 10206 is pressed, a screen for setting of restriction on all data deletion shown in FIG. 8 is displayed on the LCD 316 by the controller 108.

In FIG. 8, buttons 10300 to 10302 are used to set the status of respective items in terms of restriction on deletion of all data. Each time one of these buttons 10300 to 10302 is pressed, the status is toggled between a state in which deletion is limited and a state in which deletion is allowed. The status is stored in a table (not shown) and managed by the controller 108. If a delete command is issued, the controller 108 examines the table to determine whether deletion is allowed, and performs deletion of data according to the status stored in the table, as will be described in further detail later. If a close button 10303 is pressed, the setting performed via the screen is applied (stored in the table), and the screen returns to the screen shown in FIG. 7, under the control of the controller 108. If a cancel button 10304 is pressed, the setting is cancelled, and the current screen returns to the screen shown in FIG. 7, under the control of the controller 108.

The buttons 10300 to 10302 used to specify the status in terms of the restriction on deletion of all data may be in the form of check boxes or lists.

In a default state, all-data deletion may be allowed or limited for all items. In the present embodiment, it is assumed that all-data deletion is allowed in the default state.

Figure 9:
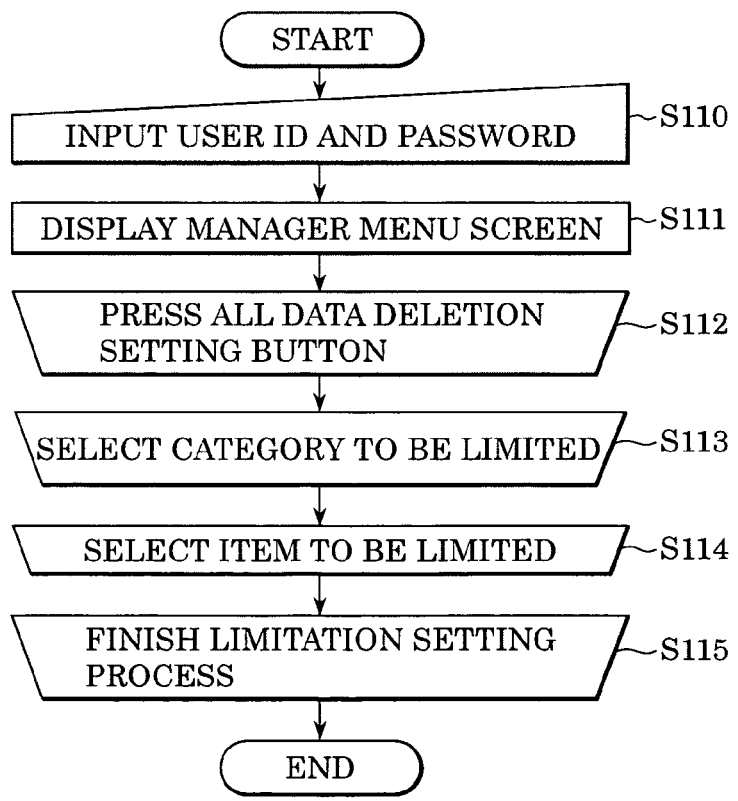
FIG. 9 is a flow chart showing an example of a data processing procedure performed by an image forming apparatus according to an embodiment of the present invention.

FIG. 9 is a flowchart showing an example of a first data processing procedure performed by the image forming apparatus according to an embodiment of the present invention. In this first data processing procedure, setting in terms of restrictions on deletion of data is performed by a user authorized as an administrator. The steps shown in the flow chart (S110 to S115) are performed by the controller 108 shown in FIG. 1 by executing a control program loaded in a RAM, for example, from a ROM. Various functions are implemented by executing corresponding control programs (control modules) by the CPU of the controller 108.

First, in step S110, an administrator of this image forming apparatus inputs his/her user ID and password by operating keys on the operation unit 102 to log in as an administrator to the image forming apparatus. The controller 108 examines the management table to check whether the input user ID and password are equal to those registered in the management table. If they are correct, the user is regarded as an authorized administrator and is allowed to log in to the image forming apparatus. Instead of directly inputting the user ID and password by operating keys in the authentication process, information necessary for authentication may be input from an ID card using an ID card reader. If the user ID and password entered are not valid, error processing (not shown) is performed. For example, an error message is displayed and the user is allowed to re-enter another user ID and password.

Upon entry of a user ID and password for a registered administrator, the image forming apparatus displays an administration screen (step S111). In step S112, if an all deletion setting button is pressed, an all deletion setting screen for use by administrators is displayed. An example of the screen is shown in FIG. 7. The administrator sets each item of each category in terms of allowance/restriction of deleting data. By default, deletion of all data is allowed. The administrator may impose no restriction in terms of deletion of data.

In step S113, a category which should be restricted is selected by pressing a corresponding one of buttons 10200 to 10205 in the administration menu.

Next, in step S114, to set details of the category selected in step S113, one of buttons 10206 to 10211 shown in FIG. 7 is pressed. In response to pressing one of buttons 10206 to 10211, a screen for setting each item in terms of allowance/restriction of deletion of data appears. For example, if the button 10206 is pressed, a screen shown in FIG. 8 is displayed on the LCD 316.

Finally, in step S115, if the close button 10212 shown in FIG. 7 is pressed after setting is completed for all categories corresponding to the buttons 10200 to 10205, the setting performed by the administrator is applied (more specifically, for example, respective flags in the restriction table stored in the image memory 107 or a nonvolatile memory (not shown)

are set in accordance with the setting performed by the administrator), and the restriction setting process is ended.

If the cancel button 10213 shown in FIG. 7 is pressed, the restriction setting process is ended without applying the setting performed in steps described above for any category. When the close button 10212 or the cancel button 10213 is pressed, the screen returns to the administration screen. A deleting process of information stored in a box performed by a user of the box is described next.

Process of Deleting Information from Box by a User

Figure 10:
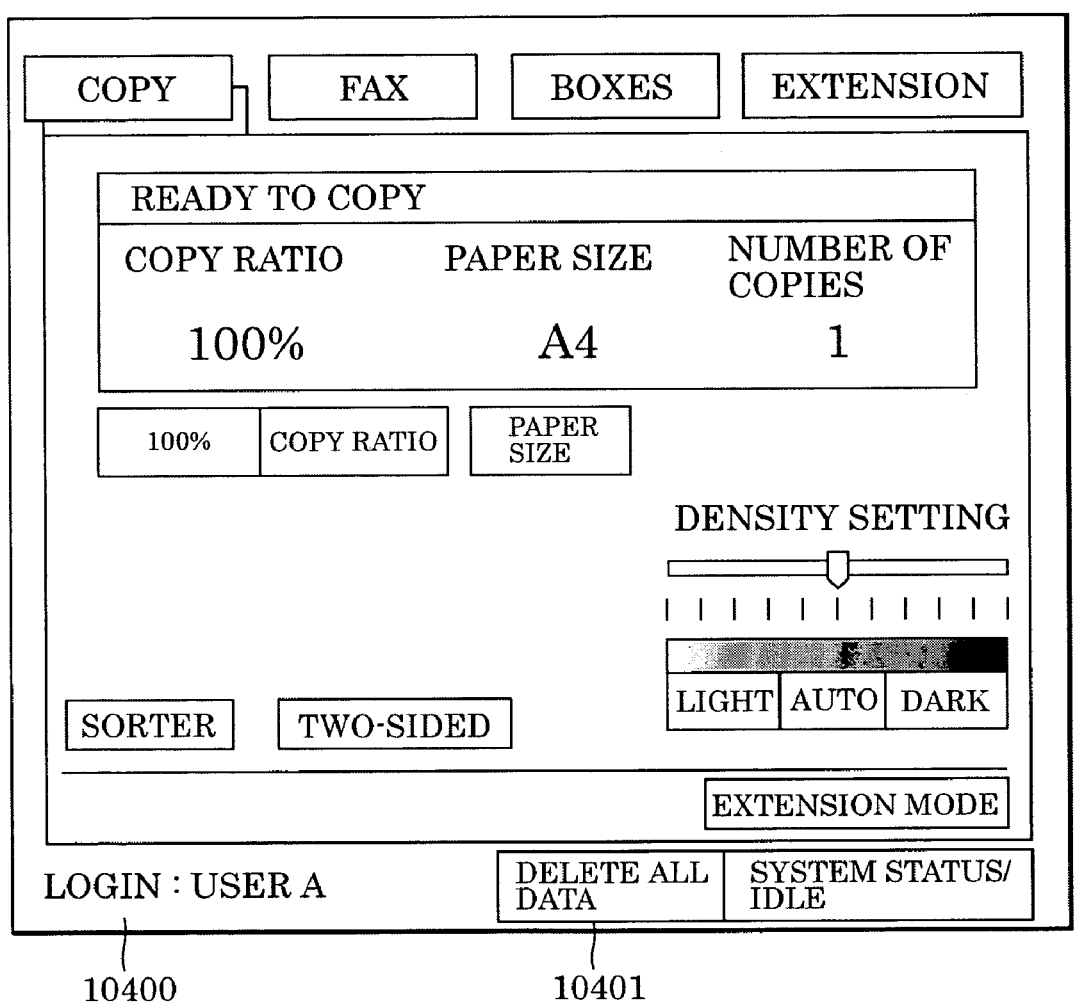
FIG. 10 is a diagram showing an example of a login screen displayed on the LCD shown in FIG. 3.

FIG. 10 is a diagram showing an example of a screen displayed on the LCD 316 shown in FIG. 3. This login screen customized for each user appears when a user is authenticated as an authorized user in the process described with reference to FIG. 6.

In FIG. 10, a user name of an authorized user is displayed in a user name display field 10400 so that the user can confirm that he/she is a correct login user. If a delete-all button 10401 is pressed, an all data deletion menu such as the one shown in FIG. 11 is displayed on the LCD 316.

Figure 11:
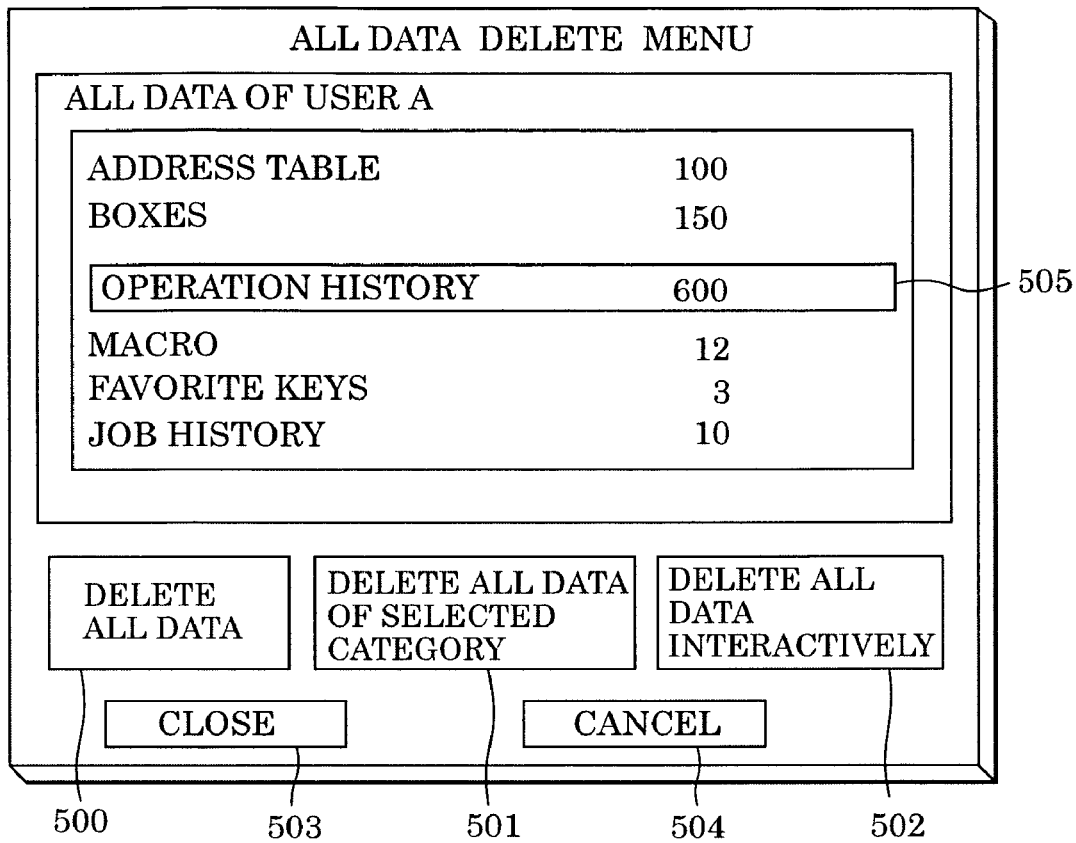
FIG. 11 is a diagram showing an example of an all data deletion menu screen displayed on the LCD shown in FIG. 3.

FIG. 11 shows an example of an all data deletion menu displayed on the LCD 316 shown in FIG. 3. This all data deletion menu is displayed on the LCD 316 by the controller 108 when the controller 108 detects that the delete-all button 10401 is pressed on the login screen shown in FIG. 10.

The screen displayed on the LCD 316 is arranged for each user in accordance with information obtained by retrieval using a login user ID as a key.

In FIG. 11, a first delete button 500 is used to issue a command to delete all data at a time. In the present embodiment, when the first delete button 500 is pressed, all data is deleted except for data of categories or items set by an administrator (a user authorized as an administrator) of the image forming apparatus to be undeletable.

A second delete button 501 is used by a user to issue a command to delete all data of a particular category (such as an address table, a box, an operation history, macros, short-cut keys, or job history) specified by the user. A third delete button 502 is used to interactively issue a command to delete data in accordance with a wizard.

If a close button 503 is pressed, the all data deletion process is ended. If a cancel button 504 is pressed, the setting in terms of deletion of data is cancelled. A category whose deletion is restricted by the setting performed by the administrator is displayed in a highlighted (shaded) fashion 505 under the control of the controller 108.

Figure 12:
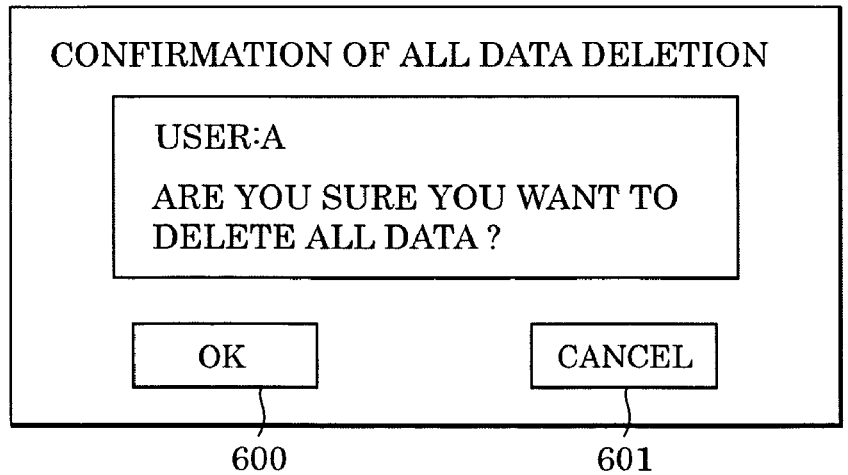
FIG. 12 is a diagram showing an example of an all data deletion confirmation screen displayed on the LCD shown in FIG. 3.

FIG. 12 is a diagram showing an example of a screen for confirmation of all data deletion, displayed on the LCD 316 shown in FIG. 3. This screen is displayed for confirmation when the first delete button 500 on the all data deletion menu shown in FIG. 11 is pressed by a user to delete all user information stored in a box.

If an OK button 600 shown in FIG. 12 is pressed, the controller 108 deletes all personal information associated with an authorized user (for example, by overwriting particular value or random value thus creating a free memory area), except for data of categories whose deletion is restricted. If a cancel button 601 is pressed, the controller 108 switches the screen displayed on the LCD 316 to the login screen shown in FIG. 10.

Figure 13:
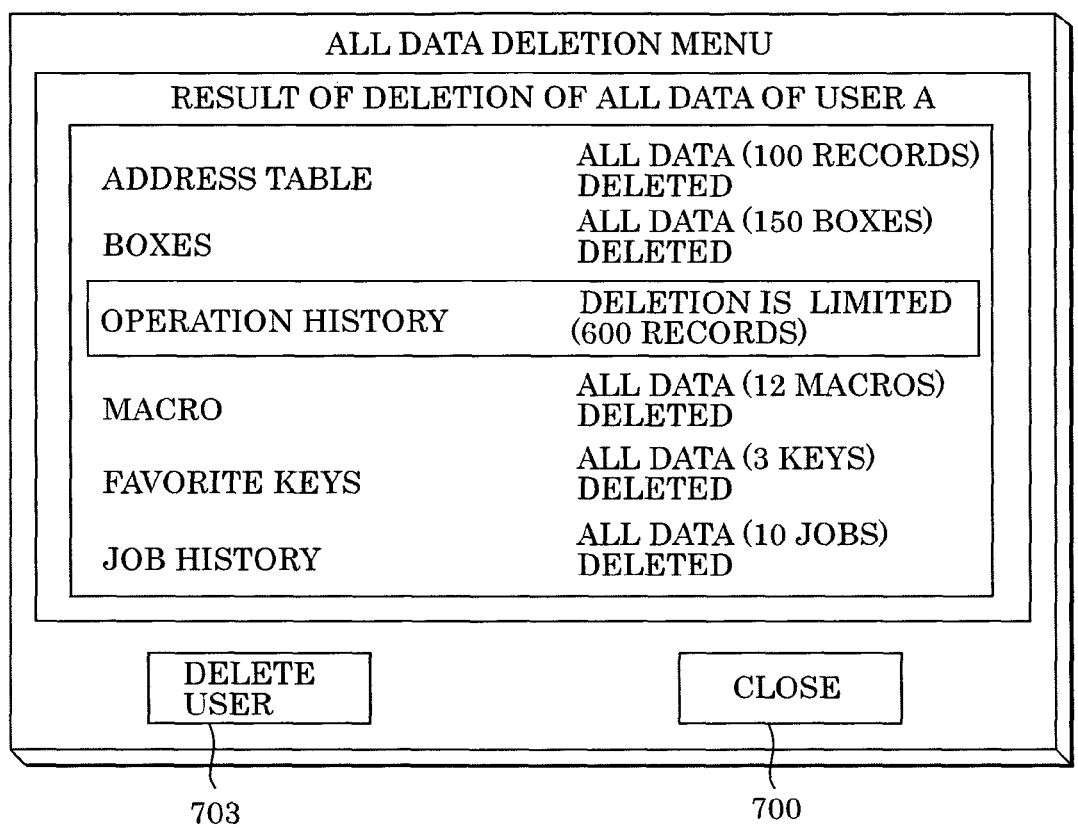
FIG. 13 is a diagram showing an example of an all data deletion result screen displayed on the LCD shown in FIG. 3.

FIG. 13 is a diagram showing an example of a screen displayed on the LCD 316 shown in FIG. 3 to indicate the result of data deletion. This screen is displayed when the process of deleting all user data in the box started in response to pressing the first delete button 500 on the all data deletion menu shown in FIG. 11 is completed.

In FIG. 13, if a close button 700 is pressed, the controller 108 closes the current screen and displays the screen shown in FIG. 10. In the example shown in FIG. 13, the result of deletion of all information of a user A is displayed and indicates that all data has been deleted except for data of a deletion-restricted category (in this example, operation history). If a user delete button 703 is pressed, user account information associated with the box allocated on the image memory 107 of the image forming apparatus is deleted, and the user is logged off the image formation apparatus.

To prevent the user delete button 703 from being pressed by accident, the controller 108 may enable the user delete button 703 only when all data has been deleted except for data of a deletion-restricted category specified by the administrator.

Figure 14:
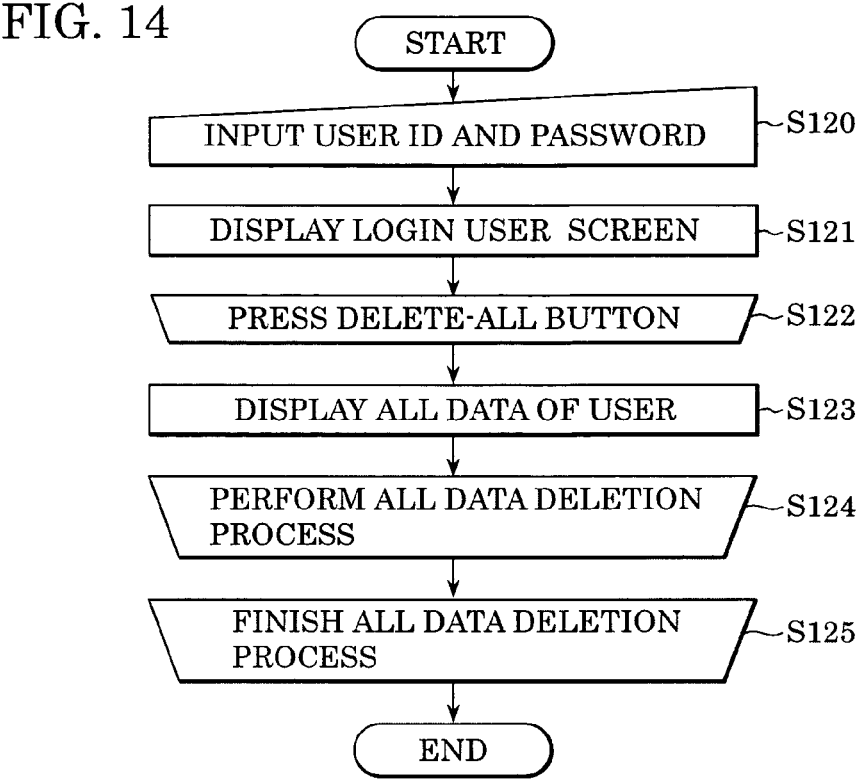
FIG. 14 is a flow chart showing an example of a data processing procedure performed by an image forming apparatus according to an embodiment of the present invention.

FIG. 14 is a flowchart showing an example of a second data processing procedure performed by the image forming apparatus according to an embodiment of the present invention. In this second data processing procedure, data deletion is performed by an authorized ordinary user (non-administrator). In the flow chart, steps in the processing procedure (S120-S125), are performed by the controller 108 shown in FIG. 1 by executing a control program loaded in a RAM, for example, from a ROM. Various functions are implemented by executing corresponding control programs (control modules) by the CPU of the controller 108.

First, in step S120, to log in to the image forming apparatus, a user inputs a user ID in the user ID input field 10001 of the personal authentication screen and a password in the password input field 10002. If the user inputs his/her user ID and password by operating keys on the operation unit 102, the controller 108 examines the management table to check whether the input user ID and password are equal to those registered in the management table. If they are correct, the user is regarded as an authorized user and is allowed to log in to the image forming apparatus. If they are not correct, error processing is performed and login is not permitted.

If login is permitted by the controller 108, in step S121, a menu screen personalized depending on the user is displayed as shown in FIG. 10.

Next, in step S122, if the delete-all button 401 shown in FIG. 10 is pressed, the controller 108 switches the screen displayed on the LCD 316 to an all data deletion menu screen shown in FIG. 11 for deleting data associated with the user from the image forming apparatus. Before switching to the all data deletion menu screen shown in FIG. 11, a screen for confirmation of whether the user really wants to delete all data may be displayed as shown in FIG. 12 to prevent data from being deleted by accident.

If the controller 108 detects pressing of an OK button 600 shown in FIG. 12 or the delete-all button 401 shown in FIG. 10, the process proceeds to step S123. In step S123, the controller 108 switches the login screen (shown in FIG. 4) currently displayed on the LCD 316 to a screen (shown in FIG. 11) on which a list of all data of respective categories associated with a login user (user A in the example shown in FIG. 11) is displayed.

More specifically, data of respective categories such as address data, box data, operation history data, macro data, short-cut data, job history data, etc., produced or registered by the login user, are retrieved and information indicating the detected data is displayed in the form of a list as shown in FIG. 11.

The controller 108 may display the information indicating the retrieval result such that data of categories specified by the administrator as subject to restriction on deletion are not displayed or displayed in a highlighted manner (shaded manner) as with a category 505 (operation history) in the example shown in FIG. 11.

Next, in step S124, if one of the first to third buttons 500 to 502 on the screen shown in FIG. 11 is pressed, the controller 108 detects the type of the pressed button. In step S125, all data stored in specified boxes of the user who logged in step S120 are deleted, and the process is ended.

Subsequently, the controller 108 switches the screen displayed on the LCD 316 to a screen shown in FIG. 13 to show the result of the data deletion. For example, in a case in which a user specifies all data to be deleted at a time, all data are deleted except for data of categories specified by the administrator of the image forming apparatus as subject to restriction on deletion, and deleted categories and the number of records of respective deleted categories are displayed as shown in FIG. 13.

In the deletion result screen shown in FIG. 13, the operation history category is shaded to indicate that this category was specified by the administrator as subject to deletion restriction in the process shown in FIG. 9 and thus all data were not deleted. Alternatively, categories restricted in terms of deletion may not be displayed. The method according to the present embodiment makes it possible to delete all data at a time, and thus the method is useful in particular when it is needed to delete a large amount of data as in the case where it is needed to delete all data associated with a user who will no longer use the image forming apparatus because of a personnel change or the like. If a close button 700 is pressed, the all data deletion process is ended, and the user login menu shown in FIG. 10 is displayed again.

Second Data Deletion Process

In the embodiment described above, the data deletion process is performed in response to a logged-in user pressing the button 500 so that all data are deleted except for data of categories specified in the administration menu shown in FIG. 7 as subject to deletion restriction. In contrast, in a case in which the second deletion button 501 on the all data deletion menu shown in FIG. 11 is pressed, categories to be deleted are specified by a user and data of specified categories are deleted from a box area of the image memory 107. The details of this process are described below.

Figure 15:
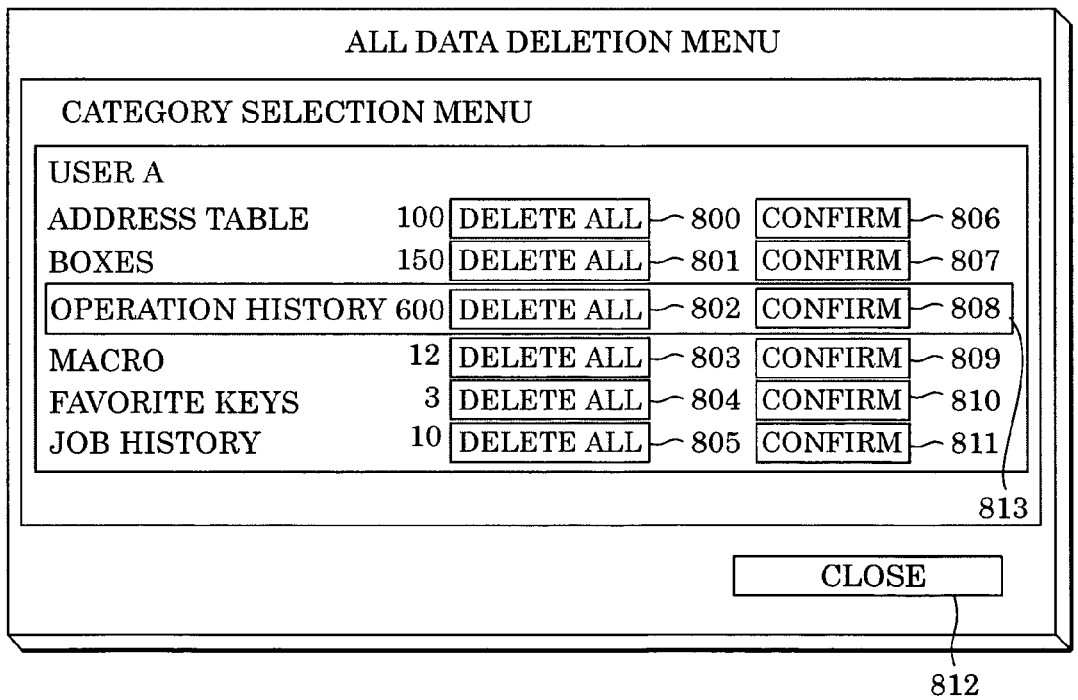
FIG. 15 is a diagram showing an example of an all data deletion menu screen displayed on the LCD shown in FIG. 3.

FIG. 15 is a diagram showing an example of an all data deletion menu displayed on the LCD 316 shown in FIG. 3. This all data deletion menu is displayed under the control of the controller 108 when the second deletion button 501 on the all data deletion menu shown in FIG. 11 is pressed.

In FIG. 15, deletion buttons 800 to 805 are used to specify respective categories, address table, boxes, operation history, macros, short-cut keys, and job history, to be deleted.

After data specified by the user by pressing one or more of buttons 800 to 805 are deleted, if corresponding confirm buttons 806 to 811 are pressed, the controller 108 displays a confirmation screen (described later with reference to FIG. 17) for confirmation. If a close button 812 is pressed, the controller 108 switches the screen to the login screen shown in FIG. 10.

Figure 16:
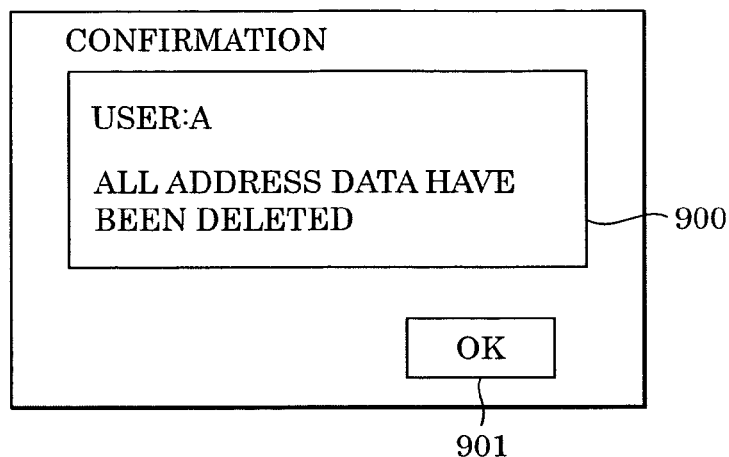
FIG. 16 is a diagram showing an example of a confirmation screen displayed on the LCD shown in FIG. 3.

FIG. 16 shows an example of a confirmation screen displayed on the LCD 316 shown in FIG. 3. This confirmation screen is displayed after personal data of a category specified by a delete button 800 is deleted.

In FIG. 16, a data deletion notification message 900 is displayed on the confirmation screen. If an OK button 901 is pressed, the controller 108 switches the screen to the all data deletion menu screen shown in FIG. 15.

That is, if the second deletion button 501 on the screen shown in FIG. 11 is pressed, the screen shown in FIG. 15 for deleting data of a specified category appears. On this screen, a category to be deleted is specified by pressing a corresponding one of delete-all buttons 800 to 805.

When a category is specified by the administrator as restricted in terms of deletion, the category may be shaded 813 and selection thereof may be disabled as is the case with the operation history in FIG. 15. Alternatively, categories that are restricted in terms of deletion may be hidden.

When deletion of all data of a specified category is completed, a pop-up window shown in FIG. 16 is displayed for confirmation, and the process of deleting all data of the specified category is ended.

The pop-up screen shown in FIG. 16 allows a user to confirm the category and the number of records that have been deleted. If the user presses an OK button 901, the controller 108 switches the screen to that shown in FIG. 15. If a close button 812 on the screen shown in FIG. 15 is pressed, the process of deleting all data of the specified category is ended.

Figure 17:
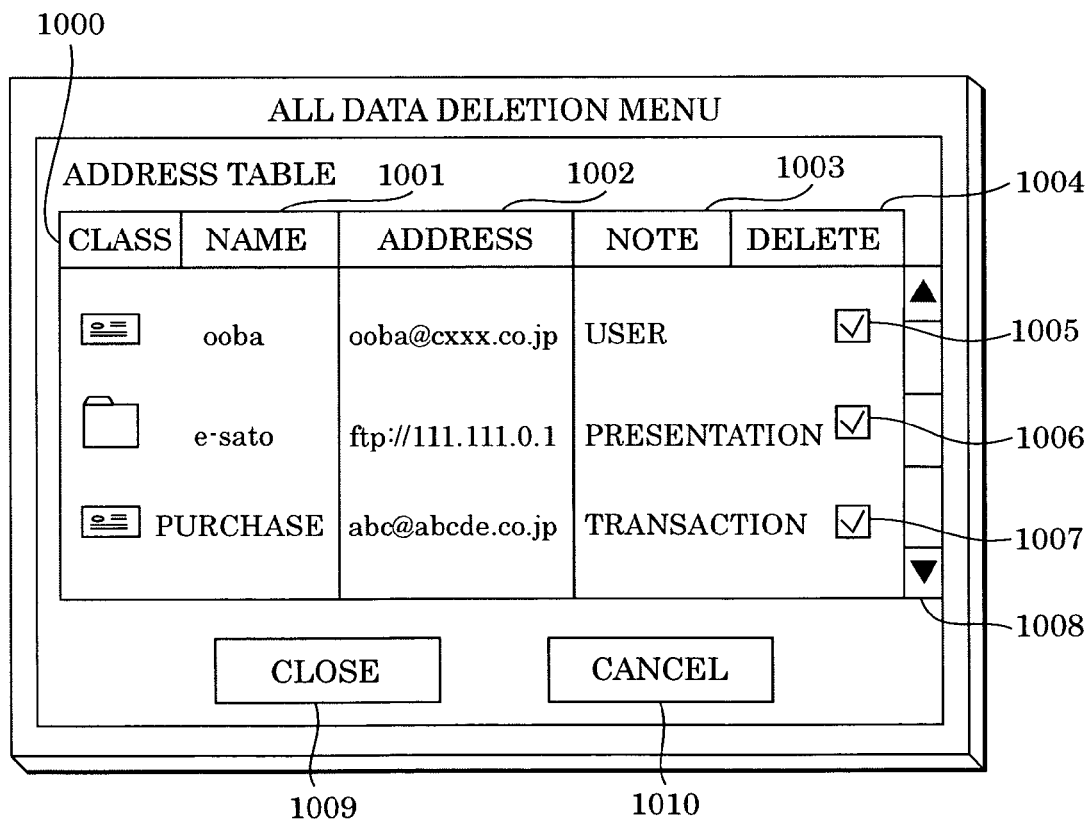
FIG. 17 is a diagram showing an example of a confirmation screen displayed on the LCD shown in FIG. 3.

FIG. 17 is a diagram showing an example of a confirmation screen displayed on the LCD 316 shown in FIG. 3. This confirmation screen is displayed when a confirmation button 806 to 811 shown in FIG. 15 is pressed. In the example shown in FIG. 17, the address table confirmation 806 was pressed.

In FIG. 17, an address table with several columns 1000-10004 is displayed. More specifically, the address table includes a class column 1000, a name column 1001, an address column 1002, a note column 1003, and a column to check as to whether data is to be deleted has been specified 1004. The administrator may set any of items 1000 to 1004 to be restricted in terms of deletion. The controller 108 displays restricted items in a shaded fashion or does not display any restricted items.

The delete column 1004 includes check boxes 1005-1007 to specify whether to delete data corresponding to the row (for example, in FIG. 17, check box 1005 is used to indicate whether data corresponding to the name ooba has been specified for deletion). Instead of check boxes, buttons may be used.

When all records cannot be displayed at the same time on the screen, hidden records can be displayed by moving a slide bar 1008 up or down. If a close button 1009 is pressed, setting is applied and the screen is closed and the menu screen shown in FIG. 15 is displayed by the controller 108. If a cancel button 1010 is pressed, setting is canceled and the menu screen shown in FIG. 15 is displayed by the controller 108.

Although in the example shown in FIG. 17, a confirmation screen for an address table is displayed, the category displayed on this confirmation screen varies depending on designation made by a user. The manner in which the confirmation screen is displayed may be modified depending on the category.

The above-described process of deleting all data of a specified category is useful when it is needed to delete all records in a box as in the case where it is needed to delete all records because the number of records has reached the maximum allowable value and there is no more memory space for storing data in the image memory 107.

Third Data Deletion Process

In the above-described process of deleting data in response to pressing the second delete button 501, personal data of a specified category is deleted. In contrast, when the third delete button 502 is pressed, user data stored in a box in the image memory 107 is deleted on a category-by-category basis in accordance with a wizard.

Referring to a flow chart shown in FIG. 18, the third data processing procedure performed by the image forming apparatus according to an embodiment of the present invention is described below. In this flow chart, steps in the processing procedure (S1100 to S1117) are performed by the controller 108 shown in FIG. 1 by executing a control program loaded in a RAM, for example, from a ROM. Various functions are implemented by executing corresponding control programs (control modules) by the CPU of the controller 108.

In this process, user's data of deletable categories are deleted category by category if a user simply responds to a wizard displayed on the LCD 316. In this example, it is assumed that no categories are specified by an administrator as restricted in terms of deletion.

The categories include address table information box information, user operation history information, macro information, short-cut key information, and job history information. In the present embodiment, deletion is performed in the above-described order of categories, although there is no particular restriction on the order in which deletion is performed.

First, in step S1100, a management table (not shown) is examined to determine whether deletion of data of the address table, which is one of categories of personal data stored in a box area, is specified by the administrator as subject to restriction. If it is determined that it is not restricted, the process proceeds to step S1101. In step S1101, the controller 108 displays an all data deletion menu screen for the address table, such as that shown in FIG. 19, on the LCD 316.

Figure 19:
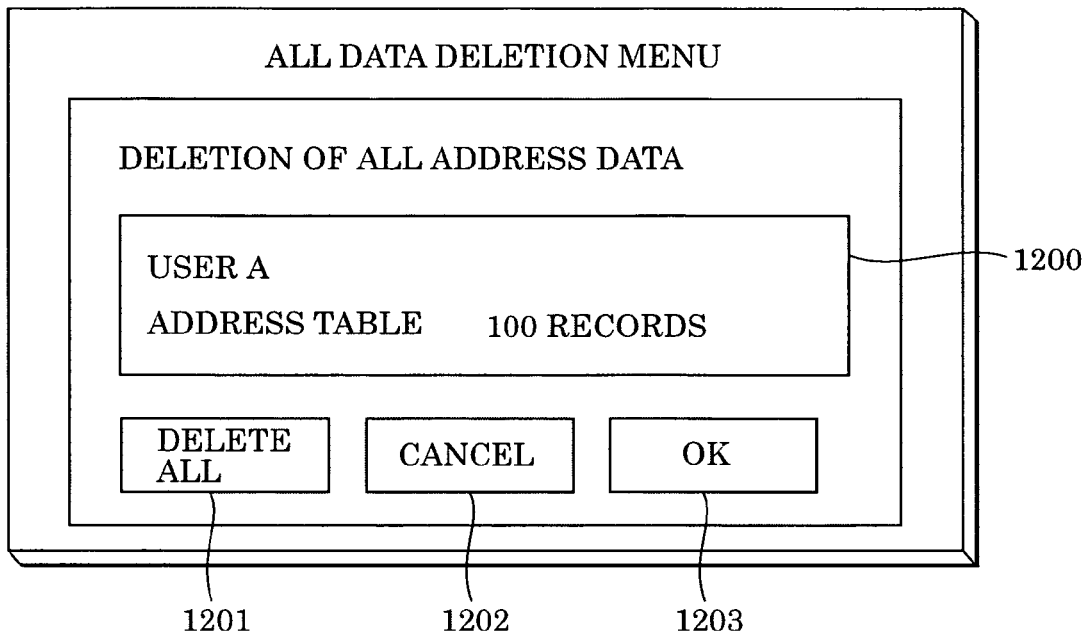
FIG. 19 is a diagram showing an example of an all data deletion screen displayed on the LCD shown in FIG. 3.

FIG. 19 is a diagram showing an example of the menu screen displayed on the LCD 316 shown in FIG. 3.

In FIG. 19, address table management data is displayed in an address table management field 1200 to indicate the number of records registered in the address table of the user A (100 records are registered in the example shown in FIG. 19). In the present embodiment, if a delete-all button 1201 is pressed, the controller 108 deletes all data of the address table of the user stored in a box area of the image memory 107. If a cancel button 1202 is pressed, the deletion of the address table is canceled. In this case, the controller 108 may switch the screen to that shown in FIG. 11 or may end the all data deletion process and switch the screen to the login screen shown in FIG. 10.

On the other hand, if the controller 108 detects that an OK button 1203 is pressed, the controller 108 switches the screen displayed on the LCD 316 to the confirmation screen for the address table data shown in FIG. 17.

Figure 20:
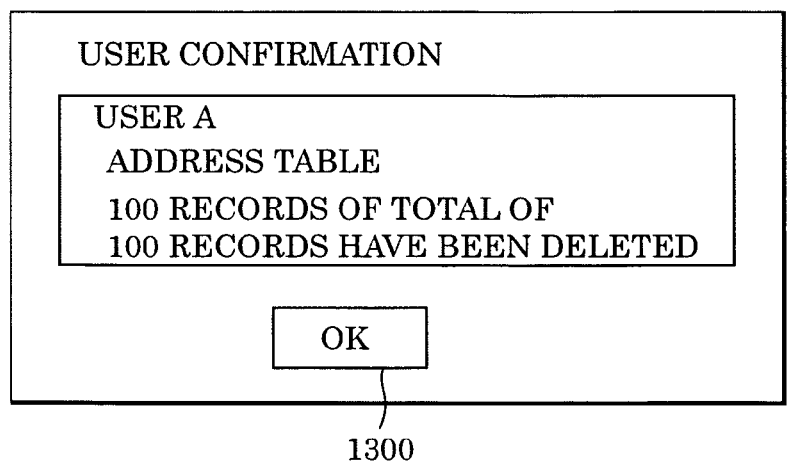
FIG. 20 is a diagram showing an example of a confirmation screen displayed on the LCD shown in FIG. 3.

FIG. 20 is a diagram showing an example of a user confirmation screen displayed on the LCD 316 shown in FIG. 3. This user confirmation screen is displayed on the LCD 316 by the controller 108 when the delete-all button 1201 shown in FIG. 19 is pressed.

In FIG. 20, if an OK button 1300 is pressed, deletion of data of the specified category is performed.

That is, in step S1102, if the delete-all button 1201 is pressed, data deletion is performed. In step S1103, if the OK button 1300 on the user confirmation screen is pressed, the process of deleting the address table data is ended, and the process proceeds to step S1104. At this stage of the process, all data of the address table of the user A has been deleted from the image memory 107.

On the other hand, if it is determined in step S1100 that deletion of the address table is restricted by the administrator, then the process proceeds to step S1104. In step S1104, a determination is made as to whether deletion of all data from a box data is restricted. If it is determined that deletion is not restricted, the process proceeds to step S1105. In step S1105, the controller 108 displays an all data deletion menu screen (not shown) for the box on the LCD 316.

In step S1106, if a delete-all command is issued by pressing the delete-all button 1201 after confirmation, all data is deleted. In step S1107, a user confirmation screen similar to that shown in FIG. 20 is displayed to notify that all box data has been deleted. If the OK button 1203 is pressed, the box deletion process is ended and the process proceeds to step S1108. At this stage of the process, all data of the box of the user A has been deleted from the image memory 107.

On the other hand, in the case in which it is determined in step S1104 that the box data is specified by the administrator as a deletion-restricted category, then, in step S1109, it is determined whether deletion of job history data is restricted. If it is determined that deletion of job history data is not restricted, the process proceeds to step S1110. In step S1110, the controller 108 displays an all data deletion menu screen (not shown) for the job history on the LCD 316.

In the next step S1111, if a delete-all command is issued by pressing the delete-all button after confirmation, all data is deleted. In step S1112, a user confirmation screen similar to that shown in FIG. 20 is displayed to notify that all job history data has been deleted. If the OK button is pressed, the job history data deletion process is ended and the process proceeds to step S1113. At this stage of the process, all box data of the user A has been deleted from the image memory 107.

Figure 18:
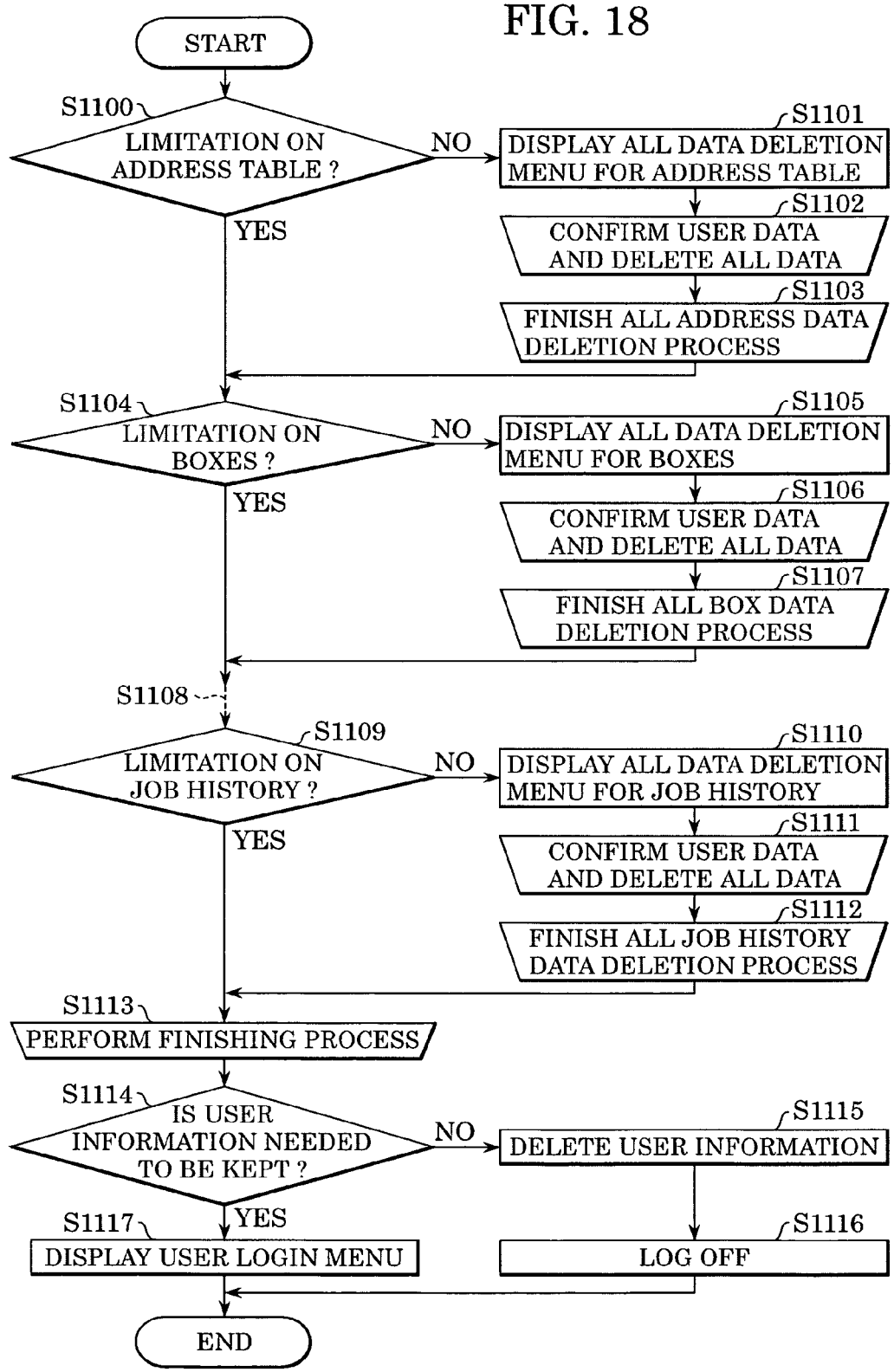
FIG. 18 is a flow chart showing an example of a data processing procedure performed by an image forming apparatus according to an embodiment of the present invention.

In step S1108 denoted by a dashed line in FIG. 18, deletion processing is performed in a similar manner for other categories (macros, short-cut keys, job history, etc.) although details thereof are not described.

After deletion is completed for all categories in step S1113, it is determined in step S1114 whether user account information should be retained by examining whether the user deletion button 703 is pressed, as in step S125 of FIG. 14. In the case in which the close button 700 shown in FIG. 13 is pressed without pressing the user deletion button 703, the process proceeds to step S1117. In step S1117, the controller 108 displays the login screen shown in FIG. 10 and ends the process.

On the other hand, it is determined in step S1114 that the user deletion button 703 was pressed, the process proceeds to step S1115. In step S1115, user account information stored in the image memory 107 is deleted. In step S1116, the user is logged off the image forming apparatus, and the process is ended.

Thus, the user can easily delete his/her personal data simply by responding to a deletion wizard displayed on the operation unit 102.

In the process described above, when there is a category whose deletion is restricted by the administrator, it is desirable that the all data deletion menu for that category not be displayed because deletion of personal information of that category from the image memory 107 is not allowed.

For example, in the present embodiment, when deletion of user operation history information is restricted by the administrator, if the delete-all button is pressed with the intention of deleting box information, the controller 108 displays a menu screen for deletion of macro information instead of user operation history information.

As described above, a user is allowed to delete data in one of three all data deletion modes by selecting one of delete buttons 500 to 502 shown in FIG. 11. This makes it possible to easily delete all data associated with a user without errors from the image memory 107 of the image forming apparatus.

That is, in the present embodiment, a user can delete all his/her personal data from the image memory 107 simply by responding to a wizard sequentially displayed on the LCD 316 of the operation unit 102.

This makes it possible to prevent some data from remaining without being deleted in the data deletion process performed by a user, for example, when the user moves to another section. Thus it is possible to prevent the memory resource of the image forming apparatus from being occupied by unnecessary data.

An administrator can specify particular data as being restricted in terms of deletion. This makes it possible to protect necessary data from being deleted.

Second Embodiment

In the first embodiment described above, personal data is deleted in a mode specified by a user by pressing one of the first delete button 500, the second delete button 501, and the third delete button 502. However, personal data stored in the image memory 107 is not necessarily used by only a particular user but can be shared by other users. In this second embodiment, to manage such personal data, data shared by a plurality of users or data allowed for other users to access is detected and managed. When a user issues a command to delete personal data in a similar manner as in the first embodiment, it is determined whether data is shared by another user. If data is shared, deletion of data is not allowed even if an all data deletion command is issued, thus preventing shared data from being deleted. The details of the second embodiment are described below. Note that a similar hardware configuration to that used in the first embodiment is also used herein, and thus a duplicated description thereof is omitted.

In this second embodiment, as in the first embodiment, a data deletion process is performed when one of three buttons 500 to 502 displayed on the all data deletion menu screen (shown in FIG. 11) displayed on the LCD 316 is pressed. However, the second embodiment is different in that the controller 108 stores job history data such as that shown in FIG. 21 in the image memory 107 or the battery-backed RAM 110 and controls the deletion process based on the stored job history data such that when a user A issues an all data deletion command, the controller 108 checks an address attribute and a user ID of the user A to determine whether data specified by the user A to be deleted is in use by another user, and the controller 108 does not allow such data to be deleted.

FIG. 21 is a diagram showing an example of a job history table stored in the battery-backed RAM 110 shown in FIG. 1. In this job history table, a history of transmission jobs performed by the image forming apparatus is described.

In FIG. 21, the job history table includes control items (shown in columns). The control items include serial number 2300, date/time 2301, section ID 2302, destination 2303, address attribute 2304, file name 2305, user name 2306, and result 2307.

In the present embodiment, the address attribute described in the address attribute control item 2304 indicates a user name that has, in his/her address table, the same address as the address used as a destination described in the destination control item 2303. The user name control item 2306 indicates a user name of a user who actually performed an operation.

The controller 108 detects the serial numbers of the serial number control item 2300 of all records whose address attribute of the control item 2304 is "A" (user "A").

If the controller 108 detects a record whose address attribute of the control item 2304 is "A", the controller 108 determines whether the user name of the control item 2306 is "A" in the deletion process.

If the user name of the control item 2306 is "A", the controller 108 determines that this record is shared by no other users and examines a next record. On the other hand, if the user name of the control item 2306 is not "A", the user (described in the user name of the control item 2306) who used address data in the address table is different from the user (described in the user attribute of the control item 2304) who owns the address table, and thus the controller 108 determines that the address data of the address table of the user "A" was used by another user.

For example, in a record denoted by 2308 having a serial number of 14 in the serial number control item 2300, the address attribute of the control item 2304 is "A", and the user name of the control item 2306 is "B". Thus, controller 108 searches the address table of the user A to detect address data having the same destination as that described in the destination control item 2303. If the same address as that described in the destination control item 2303 is found in the address table of the user A, the controller 108 does not permit deletion of the found address when the user A tries to delete it. More specifically, as shown in FIG. 22, in a confirmation screen for deletion of the address table of the user A, user information 2211 including the address detected in the above searching is shaded and deletion thereof is not allowed. Each time a record that has been used by a user other than A is found in the address table of the user A, the number of undeletable records is incremented by 1. Thus, at the end of the deletion process, the total number of undeleted records is obtained. In this specific example, deletion was denied for a total of three records of the address table of the user A, as is shown in a confirmation screen shown in FIG. 23.

FIG. 22 shows an example of a confirmation screen, which is displayed on the LCD 316 shown in FIG. 3 when one of confirmation buttons 2006 to 2011 (shown in FIG. 24) corresponding to respective categories is pressed. Note that the specific example of the confirmation screen shown in FIG. 22 is displayed when the confirmation button 2006 is pressed.

In FIG. 22, an address table including several items (columns) 2200-2204 stored in the image forming apparatus. As described above, in the example shown in FIG. 22, a record 2211 is shaded to prevent it from being deleted, because the transmission history information indicates that this record is also used by another user other than the user A. Instead of displaying deletion-restricted data in the shaded fashion, the controller 108 may not display such data.

Check boxes 2205 to 2207 in a delete column 2204 are used to specify records to be deleted. Instead of check boxes in the column 2204, buttons may be used. The controller 108 controls the deletion process such that a check box is disabled for any shaded record such as the record 2211.

The confirmation screen including the deletion check boxes 2204 may be displayed only for the purpose of confirmation of data.

When all records cannot be displayed at a time on the screen, hidden records can be displayed by moving a slide bar 2208 up or down.

If a close button 2209 is pressed, setting is applied and the screen is closed. On the other hand, if a cancel button 2210 is pressed, setting is canceled and the screen is closed. If the close button 2209 or the cancel button 2210 is pressed, the controller 108 displays an all data deletion notification screen shown in FIG. 20.

In a case in which data is deleted on a category-by-category basis, when there are more categories to be deleted after completion of deleting the address table, one of delete-all buttons 2001 to 2005 (in FIG. 24) corresponding to the category to be deleted is pressed. In response to pressing the button, deletion is performed in a similar manner to the deletion of the address table. If a close button 2012 is pressed, the all data-of-category deletion process is ended.

The all data-of-category deletion process is useful when all records in a box are deleted at a time, as in the case where all records are deleted because the number of records has reached the maximum allowable value and there is no more memory space for storing data.

Details of the data deletion process in a first data deletion mode according to the present embodiment are described next.

When a user issues an all data deletion command by pressing the delete button 500 shown in FIG. 11, the controller 108 examines the whole history information table stored in the battery-backed RAM 110 of the image forming apparatus to determine whether data specified to be deleted includes data being used by another user, and the controller 108 deletes only data that are not used by any other user.

After the all data deletion process is completed, the controller 108 displays an all data deletion completion notification on the LCD 316, as shown in FIG. 23.

FIG. 23 is a diagram showing an example of the all data deletion completion notification displayed on the LCD 316 shown in FIG. 3.

In FIG. 23, the number of deleted records is displayed in a deleted column 1901 and the number of non-deleted records is displayed in an undeleted column 1902, for each category to notify the login user A.

The number of non-deleted records displayed in the column 1902 indicates the number of records that were regarded by the controller 108 as being in use by some user other than the user A as a result of checking of the history information (table) shown in FIG. 21 and that were not allowed to be deleted in the all data deletion process. If a close button 1900 is pressed, the controller 108 ends the all data deletion process and displays the user login menu shown in FIG. 10 on the LCD 316.

If a delete user button 1903 is pressed, the controller 108 deletes user account information stored in the battery-backed RAM 110 of the image forming apparatus, and the user is logged off the image formation apparatus. The controller 108 may enable the user deletion button only when all data specified by a user has been deleted without being retained because of deletion restriction. In a case in which data specified to be deleted includes records being in use by any other user, such records being in use may be moved into data of other users (as will be described in detail later), and, thereafter, user account information may be deleted.

Alternatively, the controller 108 may not display the number of records that are retained without being deleted because of deletion restriction. As another alternative, the controller 108 may display user names that are using non-deleted records.

The all data deletion process in response to pressing the first delete button 500 according to the present embodiment makes it possible to delete all data of a specified category at a time, and thus this method is useful in particular when it is needed to delete a large amount of data as in the case where it is needed to delete all data associated with a user who will no longer use the image forming apparatus because of a personnel change or the like.

A data deletion process performed in response to pressing the second delete button 501 shown in FIG. 11 according to the second embodiment is described next.

By pressing the second deletion button 501 on the screen shown in FIG. 11, a user can delete all data of selected categories. In response to pressing the second deletion button 501, the controller 108 displays the all data deletion menu screen shown in FIG. 24 on the LCD 316.

Figure 24:
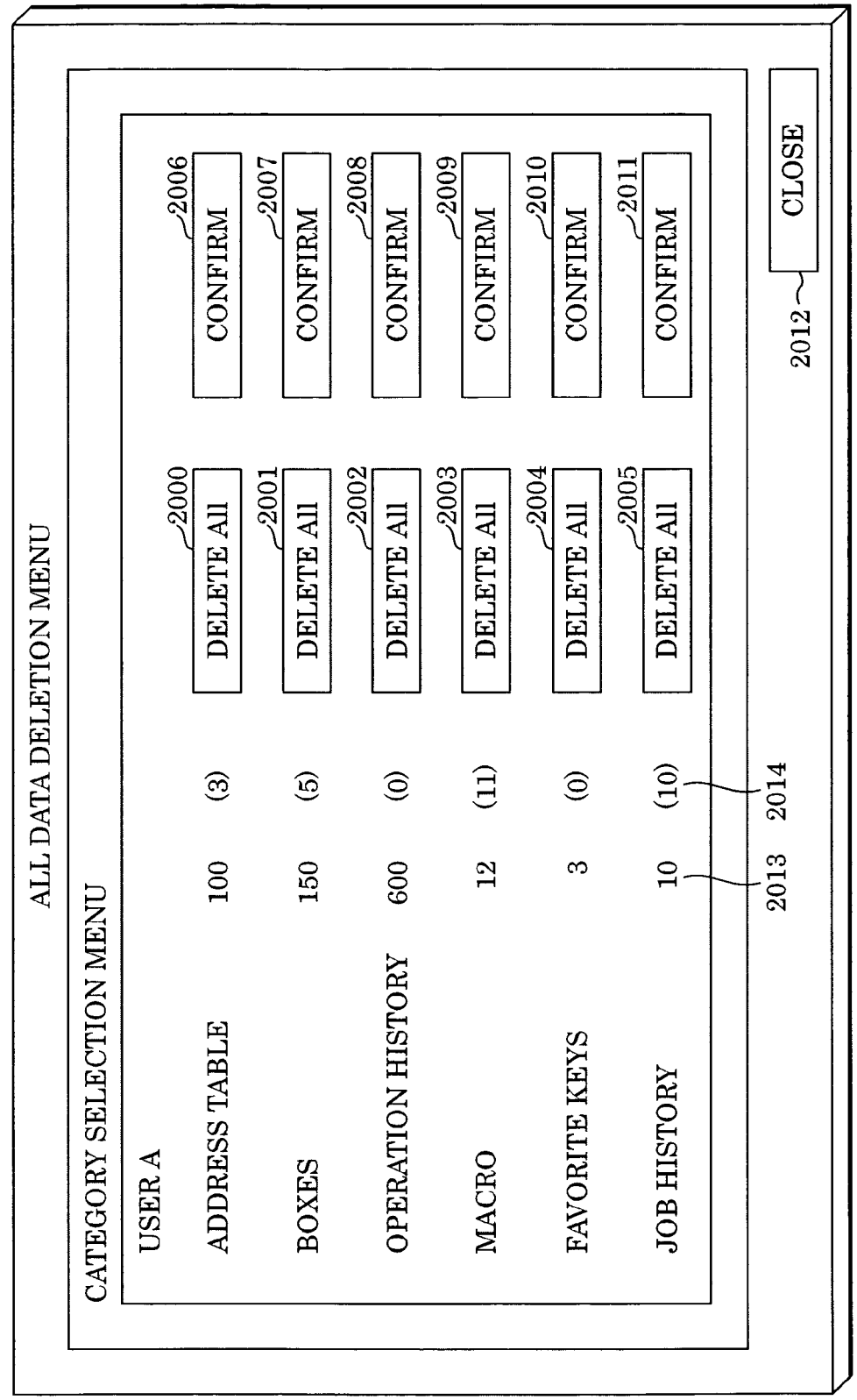
FIG. 24 is a diagram showing an example of an all data deletion menu screen displayed on the LCD shown in FIG. 3.

FIG. 24 shows an example of the all data deletion menu screen, which is displayed on the LCD 316 shown in FIG. 3 when the second delete button 501 shown in FIG. 11 is pressed. If the second delete button 501 is pressed, the history data shown in FIG. 21 is examined to detect personal information of the user which is shared by any other user for each category, and the result is displayed on the screen shown in FIG. 24.

Figure 25:
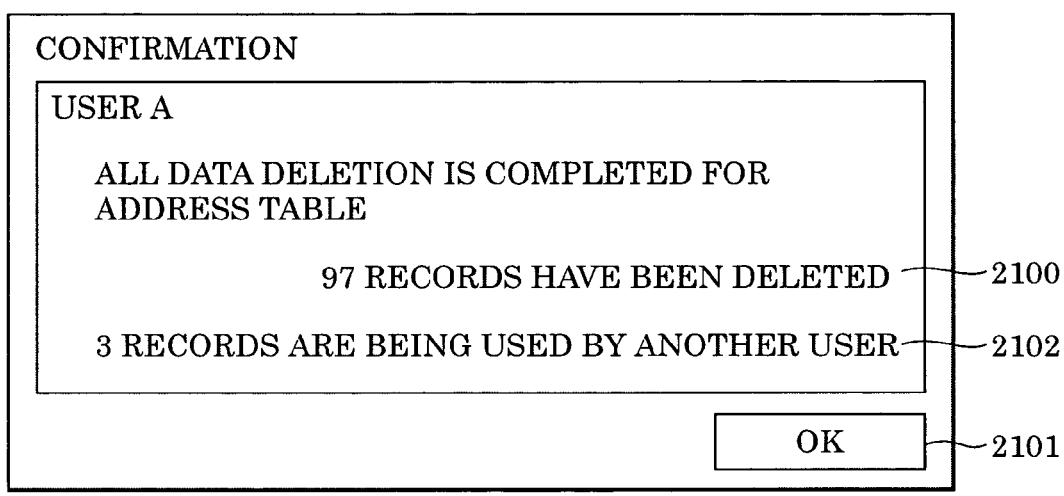
FIG. 25 is a diagram showing an example of a confirmation screen displayed on the LCD shown in FIG. 3.

In FIG. 24, delete button 2000 to 2005 are used to delete all deletable records of respective fields. If one of confirmation buttons 2006 to 2011 is pressed, the data of the corresponding category is deleted, and a deletion completion notification screen is displayed on the LCD 316 as shown in FIG. 25. If the controller 108 detects that a close button 2012 is pressed, the controller 108 closes the current screen and displays the login screen shown in FIG. 11 on the LCD 316.

The total number of registered records 2013 and the number of records that are not allowed to be deleted in the all data deletion process 2014 are displayed for each category.

FIG. 25 shows an example of the confirmation screen which is displayed on the LCD 316 shown in FIG. 3 when one of confirmation buttons 2006 to 2011 shown in FIG. 24 is pressed. The specific example of the conformation shown in FIG. 25 appears when the confirmation button 2006 is pressed.

In FIG. 25, 2100 denotes a message indicating the number of records of a particular category deleted from the image memory 107 by the controller 108.

A message 2102 displays the number of records that were determined by the controller 108 not to be allowed to be deleted based on the history information shown in FIG. 21. The message 2102 allows the user to know that all records were not deleted.

In a case in which all user data has been deleted by the controller 108 without being restricted, no data indicating the number of undeleted records is displayed on the screen shown in FIG. 25, or 0 is displayed in the message 2102.

If an OK button 2101 is pressed, the controller 108 switches the screen to the all data deletion menu screen shown in FIG. 24 to allow the user to delete data of another category. When the screen is returned from the confirmation screen shown in FIG. 25 to the all data deletion menu screen shown in FIG. 24, numbers of records displayed in column 2013 are updated.

To make confirmation in terms of data to be deleted, one of confirmation buttons 2006 to 2011 of a corresponding category is pressed.

Now, an all data deletion process using a wizard, performed when the third delete button 502 shown in FIG. 11 is pressed, is described below with reference to a flow chart shown in FIG. 26.

Figure 26:
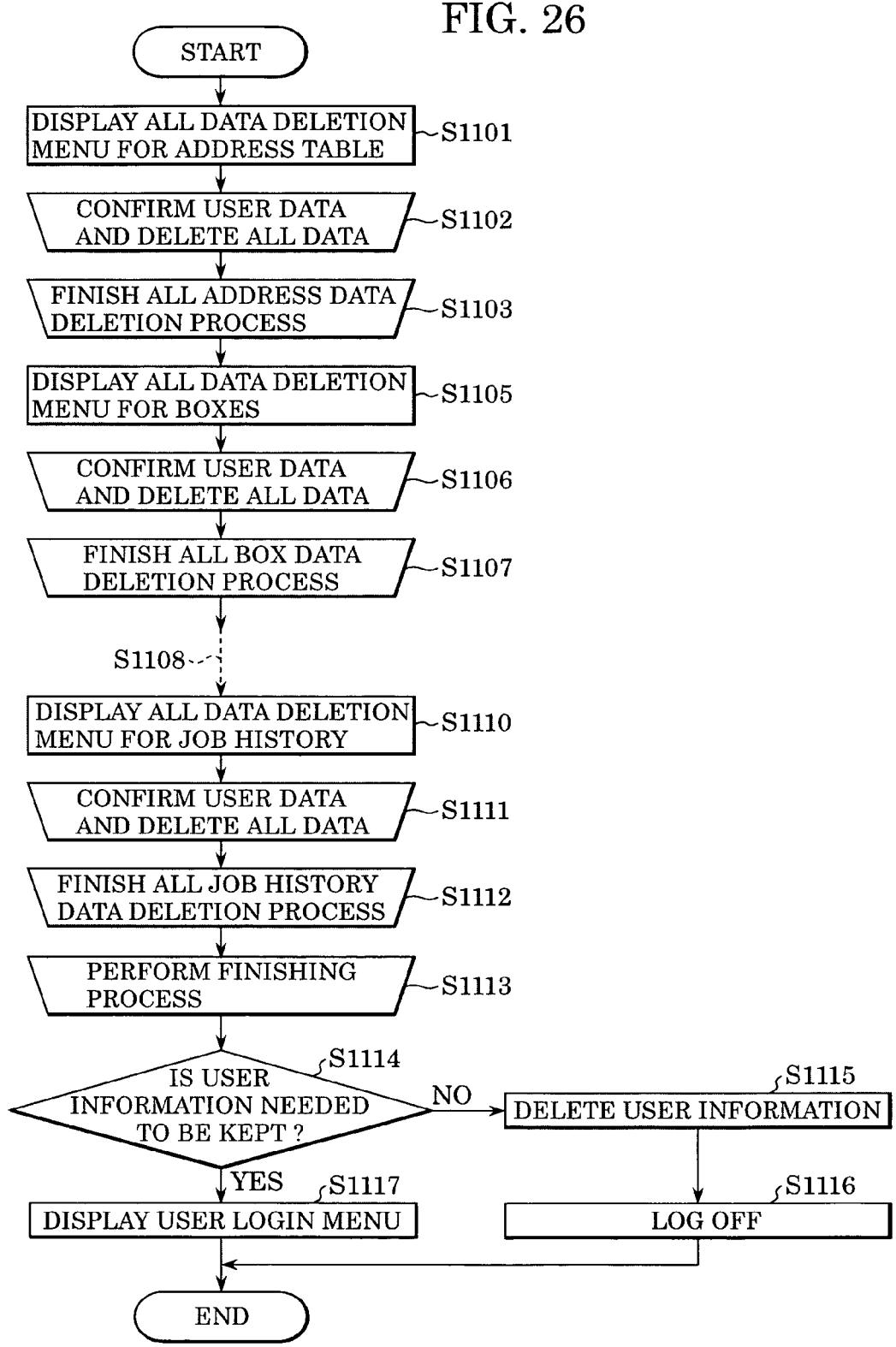
FIG. 26 is a flow chart showing an example of a data processing procedure performed by an image forming apparatus according to an embodiment of the present invention.

FIG. 26 is a flow chart showing an example of a fourth data processing procedure performed by the image forming apparatus according to an embodiment of the present invention. This process is performed to delete personal data in accordance with a wizard when the delete button 502 shown in FIG. 11 is pressed. Steps in the processing procedure (S1101-S1117) are performed by the controller 108 shown in FIG. 1 by executing a control program loaded in a RAM, for example from a ROM. Various functions are implemented by executing corresponding control programs (control modules) by the CPU of the controller 108.

In this process, all data is deleted on a category-by-category basis in accordance with the wizard. The categories include address table information box information, user operation history information, macro information, short-cut key information, and job information. In the present embodiment, deletion is performed in the above-described order of categories, although there is no particular restriction on the order in which deletion is performed.

If a user A presses a third delete button 502 on the screen shown in FIG. 11, the deletion process is started in accordance with the wizard. First, in step S1101, an all data deletion menu screen for deletion of an address table, such as the one as shown in FIG. 27, is displayed on the LCD 316 shown in FIG. 3.

Figure 27:
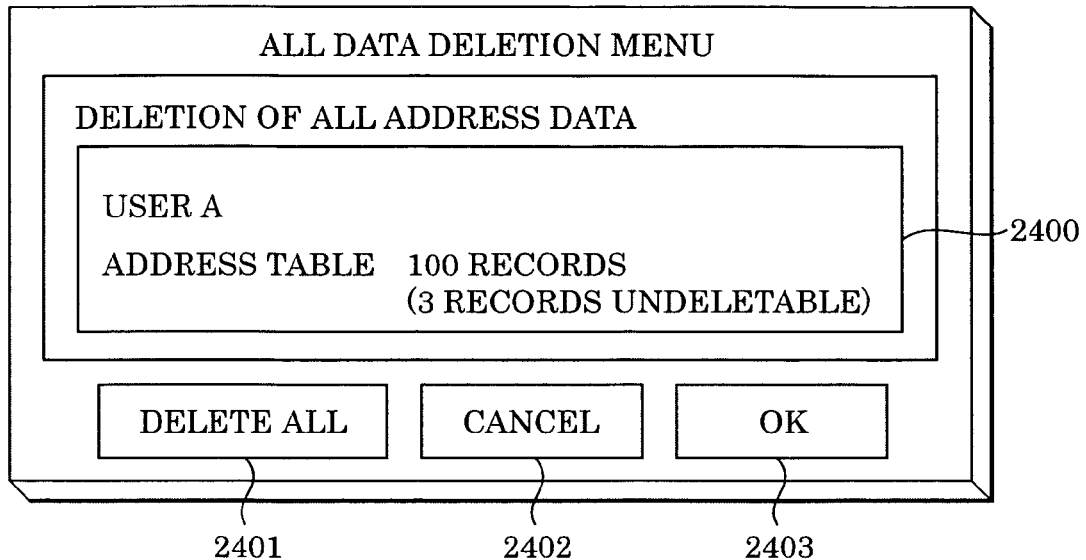
FIG. 27 is a diagram showing an example of an all data deletion menu screen displayed on the LCD shown in FIG. 3.

FIG. 27 shows an example of the all the deletion menu screen, which is displayed on the LCD 361 shown in FIG. 3 when the user A presses the third delete button 502 on the screen shown in FIG. 11.

In FIG. 27, in a display area 2400, the total number of records of the address table of the user A and the number of records determined not to be allowed to be deleted based on the transmission history information are displayed. If a delete-all button 2401 is pressed, all data of the address table of the user A is deleted except for the records that have been used by other users (in this case all records but three). If a cancel button 2402 is pressed, deletion of all address table data is canceled, and the screen returns to the all data deletion menu screen shown in FIG. 24. In this all data deletion menu screen after the return thereto, the number of records of each category retained as of when the cancel button 2402 has been pressed. Alternatively, the all data deletion process may be ended, and the screen may be switched to the screen shown in FIG. 11.

If an OK button 2403 is pressed, the controller 108 switches the screen to the confirmation screen for the address table data as shown in FIG. 25. The operation on the screen FIG. 25 is similar to that described above, and thus a further description thereof is omitted.

In the present embodiment, the number of records that are not allowed to be deleted is displayed between parentheses.

In step S1102, on the all data deletion menu screen shown in FIG. 27, after the user confirms data to be deleted, the user presses a delete-all button 2401 to delete all data of the address table.

Next, in step S1103, the confirmation screen shown in FIG. 25 is displayed on the LCD 316. If the OK button 2100 on this screen is pressed, the deletion of the address table data is finished. In the following steps S1105 to S1107, all data of a next category, that is all box data, is deleted in a similar manner to steps S1101 to S1103 in which address table data is deleted, and thus a further description thereof is omitted.

In step 1108, deletion of data is performed in a similar manner, for respective categories of user operation history information, macro information, and short-cut key information.

Finally, in steps S1110 to S1112, deletion of all job history data is performed in a similar manner.

More specifically, in step S1110, the controller 108 displays an all data deletion menu screen (not shown) for deletion of job history data on the LCD 316.

In step S1111, if the delete-all button is pressed, all job history data is deleted. In step S1112, a user confirmation screen similar to that shown in FIG. 25 is displayed to notify that all job history data has been deleted. If an OK button is pressed, the job history data deletion process is finished and the process proceeds to step S1113. At this stage of the process, all box data of the user A has been deleted from the image memory 107.

After deletion is completed for all categories in step S1113, it is determined in step S1114 whether user account information should be retained by examining whether the delete-all button 2401 is pressed on the screen shown in FIG. 27. In a case in which a cancel button 2402 is pressed without pressing the delete-all button 2401, then in step S1117, the controller 108 displays the login screen shown in FIG. 10 and ends the process.

On the other hand, if it is determined in step S1114 that the delete-all button 2401 was pressed, then in step S1115, user account information stored in the image memory 107 is deleted. Next, in step S1116, the user is logged off the image forming apparatus, and the process is ended.

In the embodiment described above, the controller 108 may examine the history data table (shown in FIG. 21) stored in the battery-backed RAM 110 of the image forming apparatus to detect address data shared by any other user.

Alternatively, a table may be used to manage the address table attribute of the user A. When any user other than the user A transmits data using the address table information of the user A, the table for managing the address table attribute of the user A is updated. When the all data deletion command is issued by the user A to delete all data of the user A, the controller 108 examines the address table attribute described in the table to determine whether data of the user A includes records that have been used by other users. If such records are detected, the controller 108 does not allow the detected records to be deleted.

Third Embodiment

In the all data deletion process according to the first or second embodiment described above, all personal data stored in the image memory 107 is deleted except for data that is detected as being in use by other users. In this third embodiment, instead of simply retaining necessary data, such data is moved into another storage area of the same storage device or another storage device.

Figure 28:
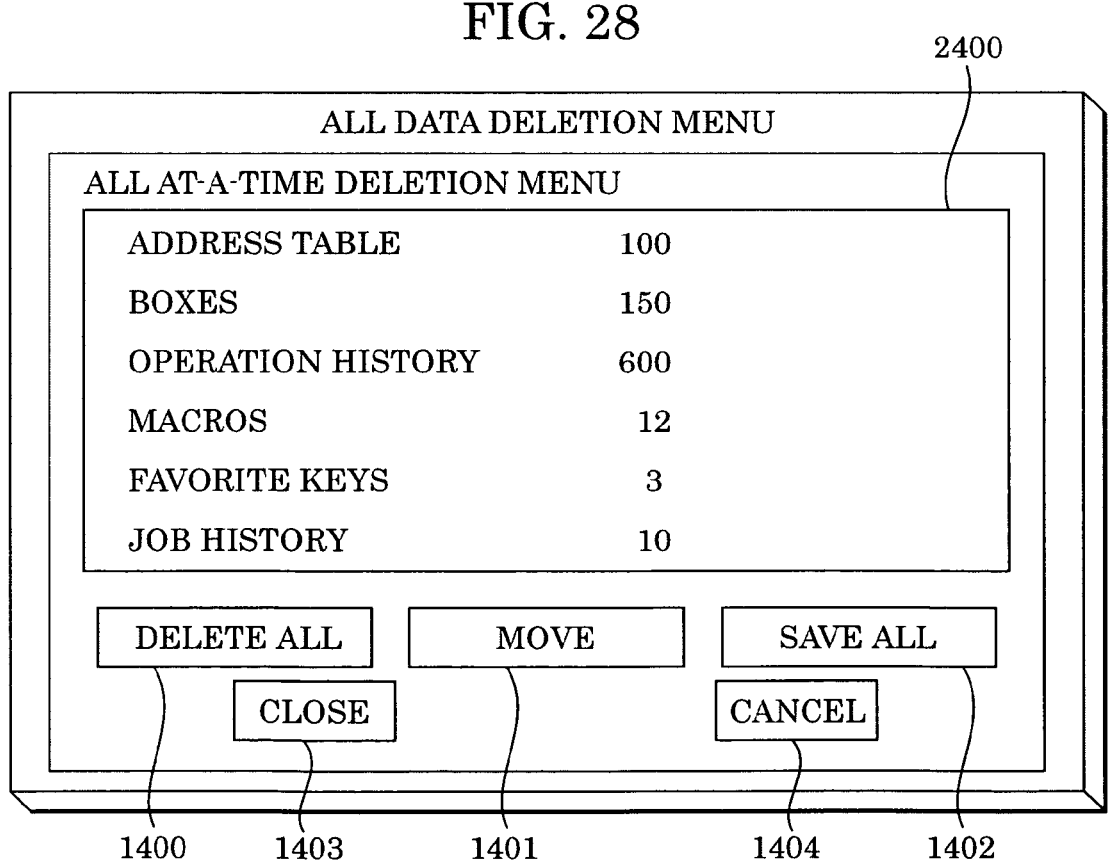
FIG. 28 is a diagram showing an example of an all data deletion menu screen displayed on an image forming apparatus according to an embodiment of the present invention.

FIG. 28 shows an example of an all data deletion menu screen displayed on the LCD 316 shown in FIG. 3 of the image forming apparatus, according to the third embodiment of the present invention. This all data deletion menu is displayed on the LCD 316 by the control of the controller 108 when the first deletion button 500 on the all data deletion menu shown in FIG. 11 is pressed to delete all data.

In FIG. 28, if a delete-all button 1400 is pressed, the controller 108 examines an authorized user management table or the like to detect data associated with a user who has issued an all data deletion command, and deletes all detected data.

Figure 29:
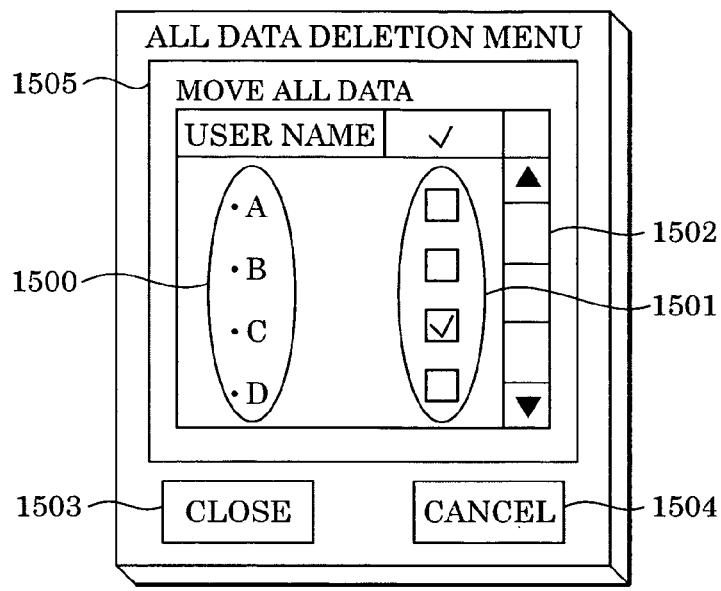
FIG. 29 is a diagram showing an example of an all data deletion menu screen displayed on the LCD shown in FIG. 3.

If a move button 1401 is pressed, the controller 108 switches the screen (shown in FIG. 28) displayed on the LCD 316 to a data movement setting screen shown in FIG. 29. If a save-all button 1402 is pressed, the controller 108 switches the current screen (shown in FIG. 28) displayed on the LCD 316 to a storage area setting screen shown in FIG. 30. In a text area 2400 of the screen shown in FIG. 28, category names and the number of detected records of each category are displayed. The screen shown in FIG. 28 may also include a button used to perform movement and saving data.

If a close button 1403 is pressed, the all data deletion process is ended. If a cancel button 1404 is pressed, the controller 108 switches the screen to the all data deletion menu screen shown in FIG. 11.

FIG. 29 shows an example of the all data deletion menu, which is displayed on the LCD 316 shown in FIG. 3 by the controller 108 when the move button 1401 shown in FIG. 28 is pressed.

In FIG. 29, user names of all users (in this example, A to D) 1500 of the image forming apparatus are displayed. A user whose data is to be moved is specified by checking a corresponding check box 1501 (a user C is specified in the example shown in FIG. 29).

When all users are not displayed at the same time, hidden users can be displayed by scrolling using a slide bar 1502. If a close button 1503 is pressed, the setting associated with data movement is applied and data is moved. After completion of data movement, a data movement completion notification screen is displayed. Thereafter, the controller 108 deletes all data and displays the all data deletion notification screen shown in FIG. 13. If a cancel button 1504 is pressed, the setting is canceled, and the controller 108 switches the screen to the all data deletion menu screen shown in FIG. 28. In a data area field 1505, a registered user name is displayed.

In the screen shown in FIG. 29, a plurality of users may be selected at a time. As described earlier, when all users are not displayed in the limited display area, hidden users can be displayed by means of scrolling using the slide bar 1502.

In a case in which the move button 1401 and the save-all button 1402 are pressed on the screen shown in FIG. 28, the controller switches the screen displayed on the LCD 316 shown in FIG. 3 to the all data deletion completion notification screen shown in FIG. 13.

On the screen shown in FIG. 13, categories and the number of records that have been moved and deleted are displayed in a deletion result display area 701. This method according to the present embodiment makes it possible to delete all data at a time, and thus the method is useful in particular when it is needed to delete a large amount of data as in the case where it is needed to delete all data associated with a user who will no longer use the image forming apparatus because of a personnel change or the like.

On the screen shown in FIG. 13, if the close button 700 is pressed, the all data deletion process is ended, and the controller 108 displays the user login menu shown in FIG. 10. If the user deletion button 703 is pressed, user account information of users of the image forming apparatus (for example, stored in the battery-backed RAM 110) is deleted, and the user is logged off the image formation apparatus.

Deletion of user account information may be allowed only when all data of respective categories have been deleted. Instead of deleting all data when data is moved, deletion of all data may be performed when a delete-all command is issued.

Figure 30:
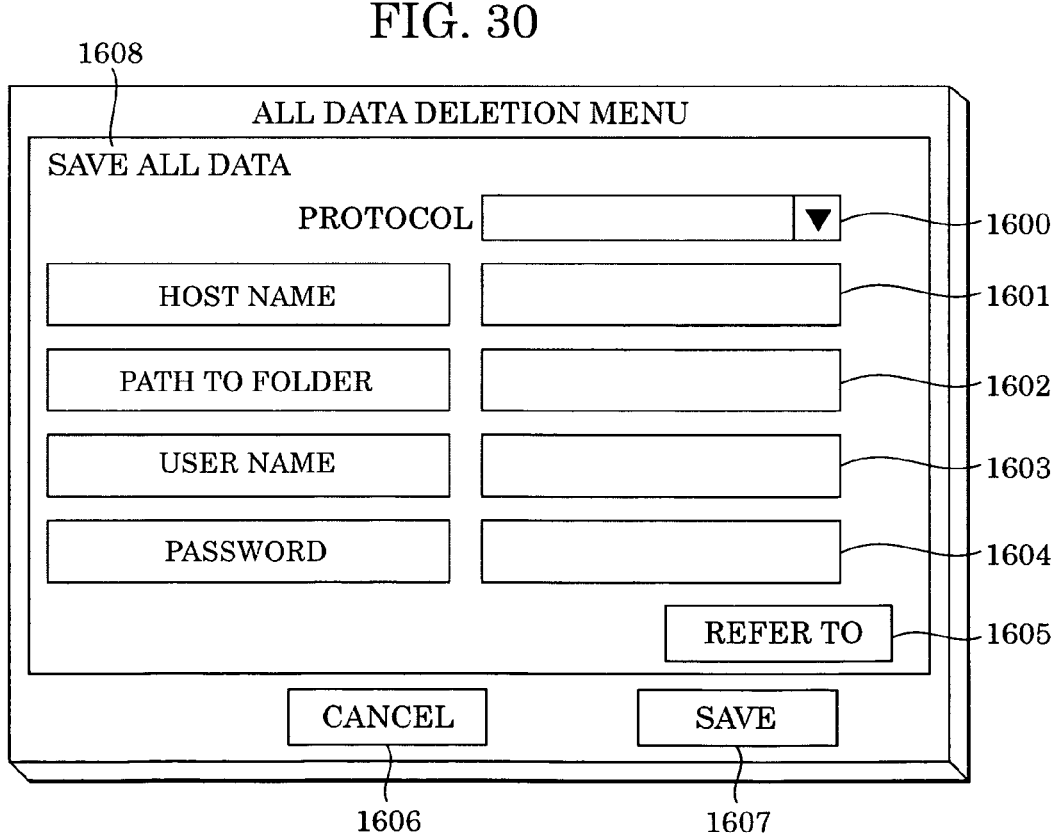
FIG. 30 is a diagram showing an example of an all data deletion menu screen displayed on the LCD shown in FIG. 3.

As described above, when the save-all button 1402 is pressed, the controller 108 switches the current screen displayed on the LCD 316 to the storage area setting screen shown in FIG. 30.

FIG. 30 shows an example of the storage area setting screen displayed on LCD 316 shown in FIG. 3, for setting a storage area in which to save data using a memory device resource on the network. The memory device resource for saving the data may be realized by connecting a storage medium such as a memory, a hard disk, a magnetic storage medium, or an optical storage medium to the image forming apparatus. The process of saving all data in the memory device resource on the network according to the present embodiment is described in further detail below.

In FIG. 30, in a data setting area 1608, a protocol, a host name, a path to a folder, a user name, and a password are set or input.

In a protocol box 1600, a list of network transfer protocols supported by the image forming apparatus is displayed. A user selects one of protocols from the list (not shown). In a host name box 1601, a name of a personal computer to which to save data or an address thereof is input. In a path-to-folder box 1602, a directory on the computer specified in the host name box 1601 to which to save data is input.

In a user name box 1603, a user ID is input to log on to the personal computer onto which to save data. In a password box 1604, a password necessary to log on to the personal computer is input.

If a cancel button 1606 is pressed, the controller 108 switches the screen to the all data deletion menu screen shown in FIG. 28 without saving data. If a refer-to button 1605 is pressed, values are automatically input in the boxes 1601 to 1604.

If a save button 1607 is pressed after data have been input or selected in the boxes 1600 to 1604, the controller 108 saves data. If the save button 1607 is pressed, personal data specified to be deleted is saved in another storage device in accordance with values input in the boxes 1601 to 1604. After saving of data is performed in response to pressing the save button 1607, a message is displayed to indicate whether the data has been successfully saved or not. Subsequently, the data specified to be deleted is deleted. The controller 108 then displays the all data deletion completion notification screen shown in FIG. 13. Changes in content displayed on this screen can occur as a result of the saving of data.

The process of deleting data performed when the first delete button 500 shown in FIG. 11 is pressed has been described above. Next, the process of deleting data performed in accordance with the present embodiment when the second delete button 501 shown in FIG. 11 is pressed is described below.

Figure 31:
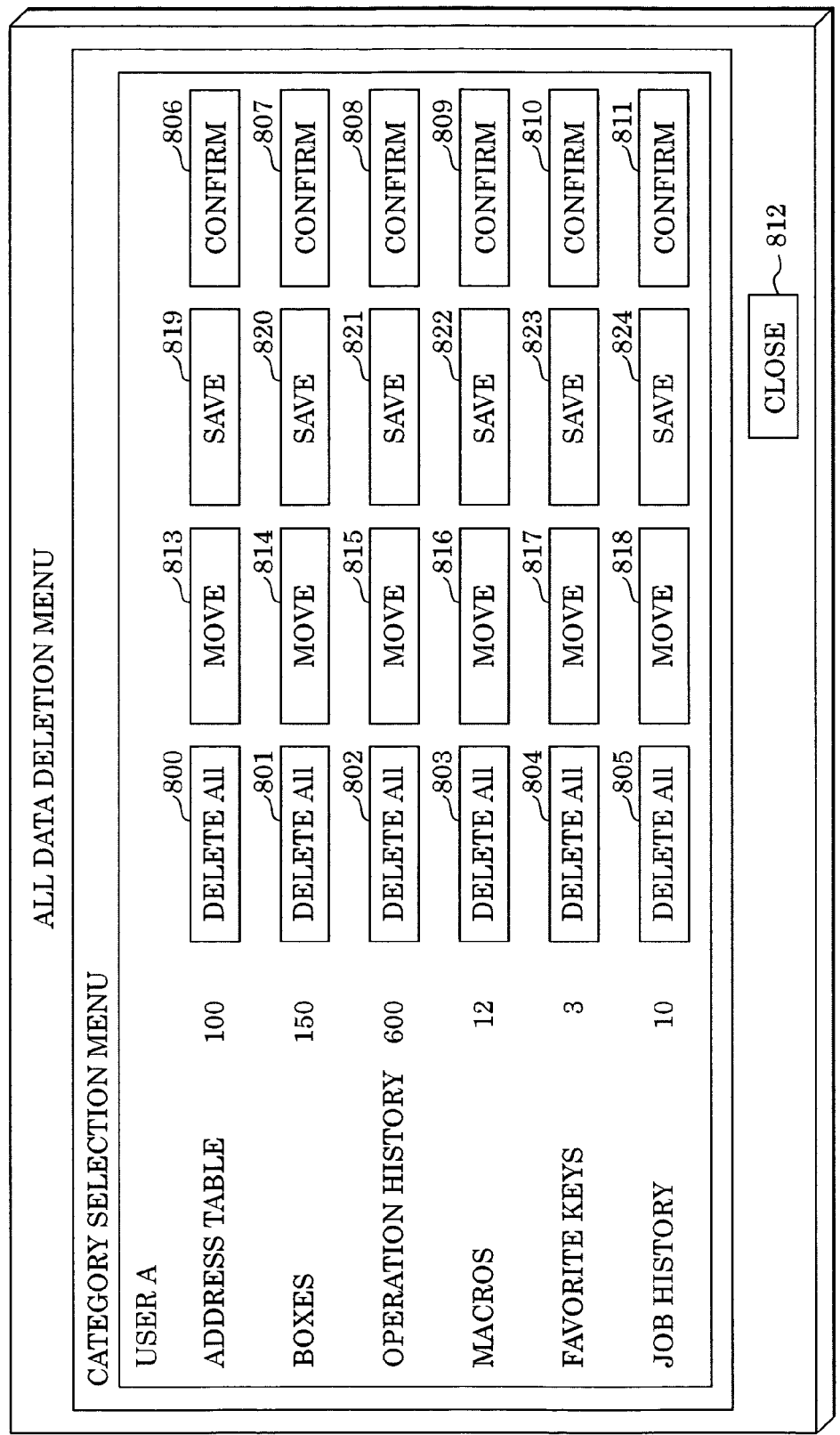
FIG. 31 is a diagram showing an example of an all data deletion menu screen displayed on the LCD shown in FIG. 3.

FIG. 31 shows an example of an all data deletion menu, which is displayed on the LCD 316 shown in FIG. 3 when data of a selected category is deleted. Similar parts to those in FIG. 15 are denoted by similar reference numerals.

On the screen shown in FIG. 31, if one of delete-all buttons 800 to 805 is pressed, all data of a category corresponding to the pressed button is deleted. When deletion of data of the specified category is completed, the controller 108 displays a pop-up screen on the LCD 316 as shown in FIG. 16 to notify of completion of data deletion, and the process of deleting data of the specified category is finished. As shown in FIG. 16, a data deletion completion message 900 displayed on the pop-up screen includes an indication of a category and the number of records deleted. If the OK button 901 is pressed, the controller 108 switches the screen to the all data deletion menu screen shown in FIG. 31.

To move data of a particular category, one of move buttons 813 to 818 corresponding to the category is pressed. For example, if a move button 813 is pressed to move data of an address table, a data movement setting screen similar to that shown in FIG. 29 is displayed. Functions of parts displayed on this screen are similar to those described above with reference to FIG. 29.

To save data of a particular category, one of save buttons 819 to 824 corresponding to the category is pressed. For example, if a save button 819 is pressed to save data of an address table, the controller 108 displays a storage area setting screen similar to that shown in FIG. 30 on the LCD 316.

The process of moving data is performed in a similar manner as described above with reference to FIG. 30.

If a close button 812 is pressed, the process of deleting data of specified categories is ended. To make confirmation in terms of data to be deleted, one of confirmation buttons 806 to 811 corresponding to a category to be deleted is pressed. For example, a confirmation message screen similar to that shown in FIG. 16 is displayed on the LCD 316 by the controller 108.

Although in the example shown in FIG. 16, a confirmation message screen for an address table is displayed, the confirmation message screen varies depending on the category. The manner in which the confirmation screen is displayed may be modified depending on the category.

The all data-of-category deletion process is useful when it is needed to delete all records in a box at a time, as in the case where it is needed to delete all records because the number of records has reached the maximum allowable value and there is no more memory space for storing data.

Finally, the process of deleting data performed in accordance with a wizard when the third delete button 502 shown in FIG. 11 is described below with reference to FIGS. 26, 32 and 33.

Figure 32:
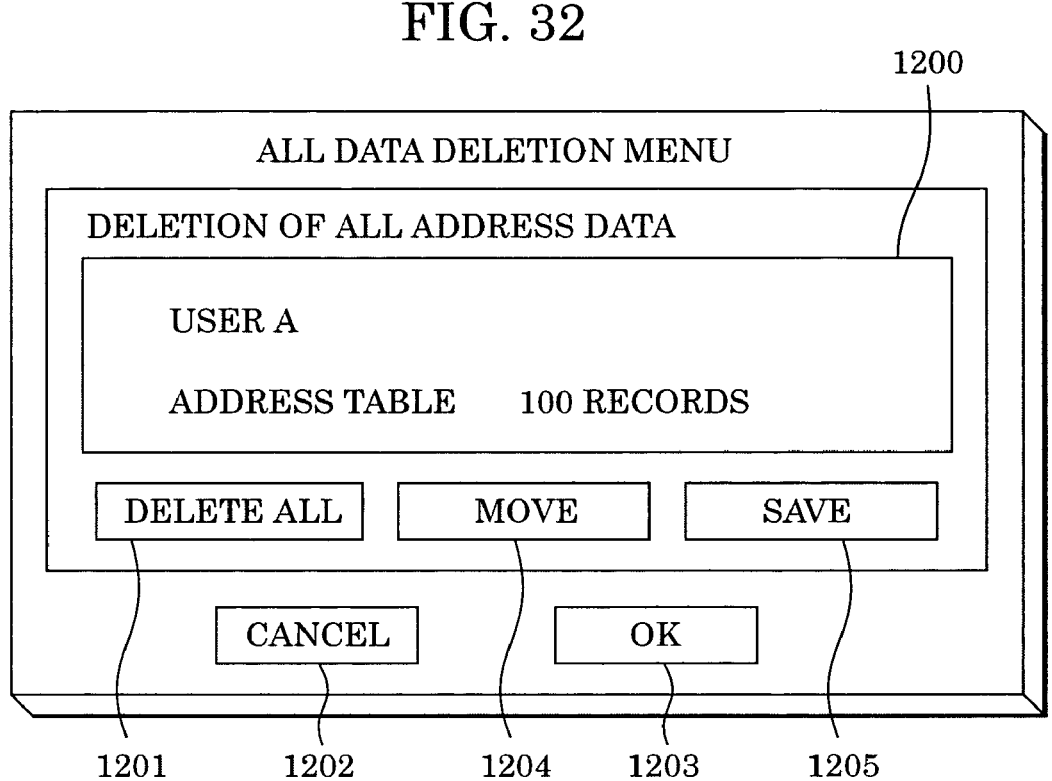
FIG. 32 is a diagram showing an example of an all data deletion menu screen displayed on the LCD shown in FIG. 3.

FIG. 32 shows an example of an all data deletion menu screen, which is displayed on the LCD 316 shown in FIG. 3 by the controller 108 in step S1101 in FIG. 26.

In FIG. 32, data indicated in an area 1200 is processed in accordance with a command issued by pressing one button 1201 to 1205, that is, deletion of all data, cancel of deletion, confirmation of data to be deleted, movement of data, or saving of data is performed depending on which of buttons 1201 to 1205 is pressed.

In the present embodiment, a user deletes all data of deletable categories by performing an operation in accordance with a wizard displayed.

In this process, all data is deleted on a category-by-category basis in accordance with the wizard. The categories include address table information box information, user operation history information, macro information, short-cut key information, and job history information. In the present embodiment, deletion is performed in the above-described order of categories, although there is no particular restriction on the order in which deletion is performed.

In FIG. 26, if the all data deletion process is started, step S1101 is performed first. In step S1101, as shown in FIG. 32, an all data deletion menu screen for deletion of an address table is displayed on the LCD 316 shown in FIG. 3. On this screen, the number of records registered in the address table of the user A is displayed.

In step S1102, if the delete-all button 1201 is pressed, all data of the address table is deleted. If the move button 1204 is pressed, a screen similar to that shown in FIG. 29 appears. In accordance with conditions specified on this screen, data is transferred to another user of the image forming apparatus.

If the save button 1205 is pressed, the controller 108 switches the screen to the screen shown in FIG. 30 to allow the user to specify a condition for saving data into another personal computer. The manner of moving or saving data is similar to the manner of deleting all data described above, and thus a duplicated explanation thereof is omitted.

If the cancel button 1202 is pressed, the deletion of all address table data is canceled, and the controller 108 switches the screen to that shown in FIG. 11. Alternatively, the all data deletion process may be ended, the screen may be switched to the user login screen shown in FIG. 10. If the OK button 1203 is pressed, the controller 108 switches the screen to the confirmation screen for the address table data as shown in FIG. 13.

Figure 33:
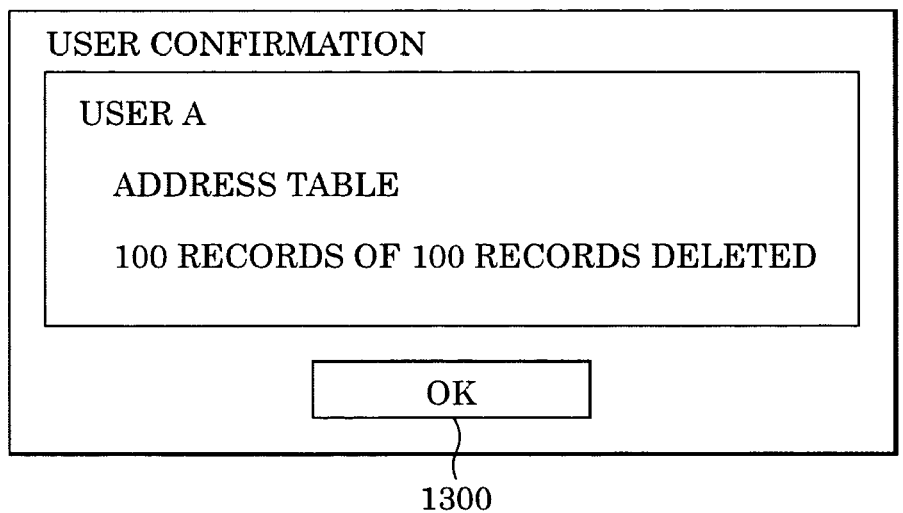
FIG. 33 is a diagram showing an example of a confirmation screen displayed on the LCD shown in FIG. 3.

FIG. 33 shows an example of a confirmation screen displayed on the LCD 316 shown in FIG. 3.

If the button 1201 is pressed, the process proceeds to step S1103. In step S1103, the controller 108 displays the confirmation screen shown in FIG. 33 on the LCD 316, and the deletion of the address table is completed. If an OK button 1300 is pressed, the process proceeds to step S1105.

Step S1105 and following steps S1105 to S1107 are performed in a similar manner to the above-described steps S1101 to S1103 in which address data is deleted, and thus a further description thereof is omitted. In step S1108, deletion of data is performed in a similar manner, for respective categories of user operation history information, macro information, and short-cut key information. Finally, in steps S1110 to S1112, deletion of all job history data is performed in a similar manner.

After deletion is completed for all categories in step S1113, the controller 108 displays on the LCD 316 a screen similar to that shown in FIG. 13 which is displayed in step S125 in FIG. 14. Thus, the process is completed.

Now, with reference to a memory map shown in FIG. 34, a data processing program, which is read and executed by the image forming apparatus according to an embodiment of the present invention, is described below.

FIG. 34 shows a memory map of a storage medium in which various data processing programs, which are read and executed by the image forming apparatus according to the present embodiment of the present invention, are stored.

Note that in addition to information shown in FIG. 34, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions shown in FIG. 9, 14, 18, or 26 according to one of embodiments may be realized by installing a program from the outside on a host computer and executing it on the host computer. In this case, information including the program according to one of embodiments of the invention may be supplied to information apparatuses or an image output apparatus from a storage medium such as a CD-ROM (compact disk-ROM), a flash memory, or a FD (floppy disk), or from an external storage medium via a network.

A storage medium having software program code stored thereon may be provided to a system or an apparatus for implementing the functions of the present invention, disclosed in the embodiments described above, and by reading and executing the program code on a computer (or a CPU or an MPU (micro-processing unit)) disposed in the system or the apparatus.

In this case, the program code read from the storage medium implements the functions disclosed in the embodiments described above.

Note that there is no restriction on the specific form of the program as long as the program can implement the functions according to one of embodiments of the invention. For example, the program may be in many forms such as object code, an interpreter program, or script data executed on the OS.

Storage media which may be employed in the present invention to store the program include a floppy disk, a hard disk, an optical disk, a magneto-optical disk, a CD-ROM, a CD-R (CD-recordable), a CD-RW (CD-rewritable), a magnetic tape, a nonvolatile memory card, a ROM and a DVD (digital versatile disk).

In this case, it should be understood that the software program code read from the storage medium implements the functions of embodiments.

The program may be provided, for example, as follows. A client computer accesses a particular web page on the Internet via a web browser, and the computer program in the original form according to one of embodiments of the present invention or a file including the computer program in a compressed form and an automatic installer is downloaded into a storage medium such as a hard disk. The program code forming the program according to one of embodiments of the invention may be divided into a plurality of files, and the files may be downloaded from different web pages. Note that a web server or an ftp (file transfer protocol) server may provide program files for implementing functions according to one of embodiments of the invention on a computer.

The program according to one of embodiments of the present invention may be stored in an encrypted form on a storage medium such as a CD-ROM, and the storage medium may be supplied to an authorized user. The authorized user may download key information needed to decrypt the encrypted program from a web page via the Internet, and may install on a computer the program decrypted by using the acquired key information.

The functions disclosed in the embodiments may be implemented not only by executing the program code on a computer, but part or all of the processes may be performed by an operating system or the like running on the computer in accordance with a command issued by the program code.

Furthermore, the program code may be loaded from a storage medium into a memory provided on an expansion board inserted into the computer or an expansion unit connected to the computer, and a part or all of the process may be executed by a CPU or the like provided on the expansion board or the expansion unit.

While the present invention has been described with reference to exemplary embodiments, it is to be understood that the invention is not limited to the disclosed embodiments. On the contrary, the invention is intended to cover various modifications (including combinations of embodiments) and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-132965 filed Apr. 28, 2004, which is hereby incorporated by reference herein.

What is claimed is:

1. An image processing apparatus, comprising:
a central processing unit;
a storage unit having storage areas and a set of categories, wherein each storage area is for storing user account information and user item information associated with stored user account information, wherein each storage area includes categories from the set of categories, and wherein user item information is stored within categories from the set of categories;
a setting unit for setting a category deletion attribute of each category, wherein the category deletion attribute is one of permit deletion and restrict deletion;
an authentication unit for authenticating a user of the image processing apparatus as an authenticated user;
an image processing unit for performing image processing using user item information of an authenticated user;
a deletion-designation reception unit for receiving a deletion designation instruction from an authenticated user, wherein each deletion designation instruction is an instruction to delete user item information, wherein the user item information to be deleted per a deletion designation instruction belongs to a category having a category deletion attribute that is set by the setting unit to permit deletion, and wherein each deletion designation instruction does not designate specific user item information;
a deletion unit for deleting user item information in accordance with a deletion designation instruction received by the deletion-designation reception unit; and
a control unit for allowing the deletion unit to delete a target user account information from the storage unit after the user item information that is associated with the target user account information is deleted from the storage unit in accordance with a received deletion designation instruction.

2. An image processing apparatus according to claim 1, further comprising a designation unit for selectively designating one of a plurality of deletion process modes, wherein the plurality of deletion process modes include at least one of
a mode in which all user item information for an authenticated user that is in any category having a category deletion attribute of permit deletion is deleted at a single time,
a mode in which only user item information for an authenticated user that is in an authenticated user selected category having a category deletion attribute of permit deletion is deleted, and
a mode in which user item information for an authenticated user that is in any category having a category deletion attribute of permit deletion is deleted category by category in accordance with a wizard.

3. An image processing apparatus according to claim 1, wherein user item information of a first authenticated user that is stored in the storage unit is accessible to users other than the first authenticated user, the image processing apparatus further comprising an access history storage unit for storing access history in terms of access of user item information of the first authenticated user by users other than the first authenticated user,
wherein the deletion unit is configured to not delete user item information having an access history that indicates a user other than the first authenticated user has accessed that user item information, even if a deletion designation instruction received by the deletion-designation reception unit designates such user item information for deletion.

4. An image processing apparatus according to claim 1, further comprising:
a movement-designation reception unit for receiving a movement designation instruction, wherein each movement designation instruction is an instruction to move user item information from a first storage area of a first authenticated user to a second storage area of a second authenticated user, wherein the user item information to be moved per a movement designation instruction belongs to a category having a category deletion attribute that is set by the setting unit to permit deletion, and wherein each movement designation instruction does not designate specific user item information; and
a movement unit for moving user item information in accordance with movement designation instruction received by the movement-designation reception unit.

5. An image processing apparatus according to claim 1, further comprising:
a save-externally-designation reception unit for receiving a save-externally designation instruction, wherein each save-externally designation instruction is an instruction to save user item information of an authenticated user into an external apparatus that is external to the image processing apparatus, wherein the user item information to be saved per a save-externally designation instruction belongs to a category having a category deletion attribute that is set by the setting unit to permit deletion, and wherein each save-externally designation instruction does not designate specific user item information; and an external saving unit for saving user item information in accordance with save-externally designation instruction received by the save-externally-designation reception unit.

6. A data processing method of performing data processing in an image processing apparatus comprising a storage unit having storage areas and a set of categories, wherein each storage area is for storing user account information and user item information associated with stored user account information, wherein each storage area includes categories from the set of categories, and wherein user item information is stored within categories from the set of categories, the data processing method comprising:
setting a category deletion attribute of each category, wherein the category deletion attribute is one of permit deletion and restrict deletion;
authenticating a user of the image processing apparatus as an authenticated user;
performing image processing using user item information of an authenticated user;
receiving a deletion designation instruction from an authenticated user, wherein each deletion designation instruction is an instruction to delete user item information, wherein the user item information to be deleted per a deletion designation instruction belongs to a category having a category deletion attribute that is set to permit deletion, and wherein each deletion designation instruction does not designate specific user item information;
deleting user item information in accordance with the received deletion designation instruction; and
allowing deletion of a target user account information from the storage unit after the user item information that is associated with the target user account information is deleted from the storage unit in accordance with the received deletion designation instruction.

7. A data processing method according to claim 6, further comprising selectively designating one of a plurality of deletion process modes, wherein the plurality of deletion process modes include at least one of
a mode in which all user item information for an authenticated user that is in any category having a category deletion attribute of permit deletion is deleted at a single time,
a mode in which only user item information for an authenticated user that is in an authenticated user selected category having a category deletion attribute of permit deletion is deleted, and
a mode in which user item information for an authenticated user that is in any category having a category deletion attribute of permit deletion is deleted category by category in accordance with a wizard.

8. A data processing method according to claim 6, wherein user item information of a first authenticated user that is stored in the storage unit is accessible to users other than the first authenticated user, the data processing method comprising:
storing access history in terms of access of user item information of the first authenticated user by users other than the first authenticated user; and
not deleting user item information having an access history that indicates a user other than the first authenticated user has accessed that user item information, even if the received deletion designation instruction designates such user item information for deletion.

9. A data processing method according to claim 6, further comprising before the user item information is deleted:
receiving a movement designation instruction, wherein the received movement designation instruction is an instruction to move user item information from a first storage area of a first authenticated user to a second storage area of a second authenticated user, wherein the user item information to be moved per the received movement designation instruction belongs to a category having a category deletion attribute that is set to permit deletion, and wherein the received movement designation instruction does not designate specific user item information; and
moving the user item information in accordance with the received movement designation instruction.

10. A data processing method according to claim 6, further comprising before the user item information is deleted:
receiving a save-externally designation instruction, wherein the received save-externally designation instruction is an instruction to save user item information of an authenticated user into an external apparatus that is external to the image processing apparatus, wherein the user item information to be saved per the received save-externally designation instruction belongs to a category having a category deletion attribute that is set to permit deletion, and wherein the received save-externally designation instruction does not designate specific user item information; and
saving user item information in accordance with the received save-externally designation instruction.

11. A non-transitory computer-readable storage medium including a computer program stored thereon for implementing a data processing method of performing data processing in an image processing apparatus comprising a storage unit having storage areas and a set of categories, wherein each storage area is for storing user account information and user item information associated with stored user account information, wherein each storage area includes categories from the set of categories, and wherein user item information is stored within categories from the set of categories, the data processing method comprising:
setting a category deletion attribute of each category, wherein the category deletion attribute is one of permit deletion and restrict deletion;
authenticating a user of the image processing apparatus as an authenticated user;
performing image processing using user item information of an authenticated user;
receiving a deletion designation instruction from an authenticated user, wherein each deletion designation instruction is an instruction to delete user item information, wherein the use item information to be deleted per a deletion designation instruction belongs to a category having a category deletion attribute that is set to permit deletion, and wherein each deletion designation instruction does not designate specific user item information;
deleting user item information in accordance with the received deletion designation instruction; and
allowing deletion of a target user account information from the storage unit after the user item information that is associated with the target user account information is deleted from the storage unit in accordance with the received deletion designation instruction.

* * * * *